(12) United States Patent
Ando

(10) Patent No.: US 11,850,997 B2
(45) Date of Patent: Dec. 26, 2023

(54) VEHICLE

(71) Applicant: TOYOTA JIDOSHA KABUSHIKI KAISHA, Toyota (JP)

(72) Inventor: Eisuke Ando, Nagoya-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/090,559

(22) Filed: Dec. 29, 2022

(65) Prior Publication Data

US 2023/0142470 A1 May 11, 2023

Related U.S. Application Data

(63) Continuation of application No. 17/659,541, filed on Apr. 18, 2022, now Pat. No. 11,560,084, which is a continuation of application No. 17/153,930, filed on Jan. 21, 2021.

(30) Foreign Application Priority Data

Jan. 31, 2020 (JP) .................................. 2020-015727

(51) Int. Cl.
*B60Q 1/14* (2006.01)
*B60Q 1/52* (2006.01)
*B60S 1/08* (2006.01)
*G05D 1/02* (2020.01)

(52) U.S. Cl.
CPC ............... *B60Q 1/143* (2013.01); *B60Q 1/52* (2013.01); *B60S 1/0807* (2013.01); *G05D 1/0212* (2013.01)

(58) Field of Classification Search
CPC ......... B60Q 1/143; B60Q 1/52; B60S 1/0807; G05D 1/0212
See application file for complete search history.

(56) References Cited

U.S. PATENT DOCUMENTS

| | | | |
|---|---|---|---|
| 10,167,015 | B2 | 1/2019 | Rust et al. |
| 2004/0176880 | A1 | 9/2004 | Obradovich et al. |
| 2017/0267256 | A1 | 9/2017 | Minster et al. |
| 2018/0079414 | A1 | 3/2018 | Tellis et al. |
| 2019/0100083 | A1 | 4/2019 | Ghannam et al. |
| 2019/0212737 | A1 | 7/2019 | Sonalker et al. |

(Continued)

FOREIGN PATENT DOCUMENTS

| | | |
|---|---|---|
| CN | 108241371 A | 7/2018 |
| EP | 3 330 827 A1 | 6/2018 |
| JP | 2016-172548 | 9/2016 |

(Continued)

OTHER PUBLICATIONS

Office Action dated Jan. 3, 2023 in co-pending U.S. Appl. No. 17/153,930, 16 pages.

(Continued)

*Primary Examiner* — Russell Frejd
(74) *Attorney, Agent, or Firm* — Oblon, McClelland, Maier & Neustadt, L.L.P.

(57) ABSTRACT

When a first driver setting mode indicates an "OFF mode" or an "AUTO mode," a VP accepts a light operation mode request from an ADK. When an operation is performed by a user, the VP changes an operation mode of a headlight in accordance with the operation by the user. When the operation by the user has not been performed, the VP changes the operation mode of the headlight in accordance with the light operation mode request.

17 Claims, 25 Drawing Sheets

(56) References Cited

U.S. PATENT DOCUMENTS

2020/0156652 A1    5/2020   Abundis Vargas

FOREIGN PATENT DOCUMENTS

| JP | 2018-105774 | 7/2018 |
| JP | 2018-132015 A | 8/2018 |
| KR | 10-2017-0015240 | 2/2017 |

OTHER PUBLICATIONS

Marinik et al., "Human Factors Evaluation of Level 2 and Level 3 Automated Driving Concepts: Concepts of Operation", Virginia Tech Transportation Institute, 2014, 54 pages.

FIG.3

| value | Description | remarks |
|---|---|---|
| 0 | No request | NO REQUEST (MAINTAIN CURRENT OPERATION MODE) keep current mode |
| 1 | TAIL mode request | TAIL MODE REQUEST side lamp mode |
| 2 | HEAD mode request | HEAD MODE REQUEST Lo mode |
| 3 | AUTO mode request | AUTO MODE REQUEST |
| 4 | HI mode request | HI MODE REQUEST |
| 5 | OFF mode request | OFF MODE REQUEST |
| 6~7 | reserved | |

FIG.5

| value | Description | remarks |
|---|---|---|
| 0 | OFF | NO FLASHING REQUEST  command for hazardlight OFF |
| 1 | ON | FLASHING REQUEST  command for hazardlight ON |

FIG.7

| value | Description | remarks |
|---|---|---|
| 0 | OFF mode request | STANDSTILL REQUEST |
| 1 | Lo mode request | Lo MODE REQUEST |
| 2 | Hi mode request | Hi MODE REQUEST |
| 3 | Intermittent mode request | INTERMITTENT OPERATION MODE REQUEST |
| 4 | Auto mode request | Auto MODE REQUEST |
| 5 | Mist mode request | Mist MODE (WIPE ONCE) REQUEST |
| 6-7 | Reserved | |

FIG.9

| value | Description | remarks |
|---|---|---|
| 0 | FAST | |
| 1 | SECOND FAST | |
| 2 | THIRD FAST | |
| 3 | SLOW | |

FIG.10

| value | Description | remarks |
|---|---|---|
| 0 | OFF mode request | STOP REQUEST |
| 1 | Lo mode request | Lo MODE REQUEST |
| 2 | reserved | |
| 3 | Intermittent mode request | INTERMITTENT OPERATION MODE REQUEST |
| 4-7 | reserved | |

FIG.14

| | |
|---|---|
| #1: CREATING A DRIVING PLAN<br>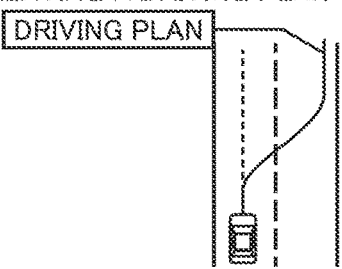 | THE ADS CREATES A DRIVING PLAN. |
| #2: EXTRACTING PHYSICAL QUANTITIES<br>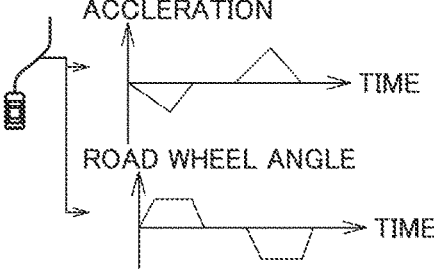 | THE ADS EXTRACTS PHYSICAL CONTROL QUANTITIES FROM THE DRIVING PLAN.<br>E.G. PHYSICAL CONTROL QUANTITIES := ACCELERATION, ROAD WHEEL ANGLE, ETC. |
| #3: SPLIT OF PHYSICAL QUANTITIES<br>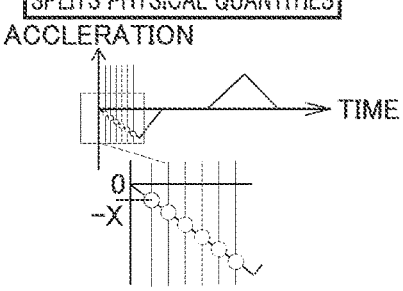 | THE ADS SPLITS THEM BY DEFINED CYCLE TIME OF EACH API. |
| #4: EXECUTION OF THE API WITH THE VALUE<br>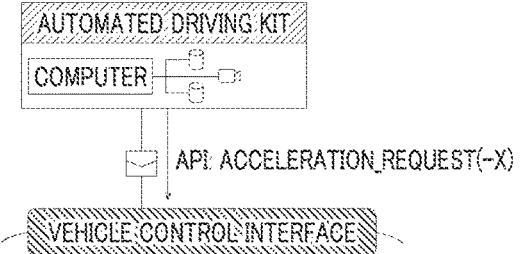 | THE ADS EXECUTES THE API WITH THE SPLIT PHYSICAL QUANTITY. |
| #5: CALCULATION OF ITS BEHAVIOR<br>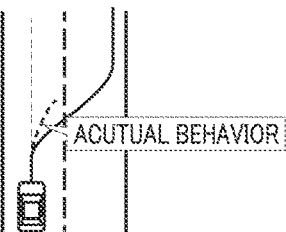 | THE ADS CALCULATES THE VEHICLE BEHAVIOR, AND RECREATES A DRIVING PLAN THAT THE VEHICLE BEHAVIOR IS REFLECTED TO |

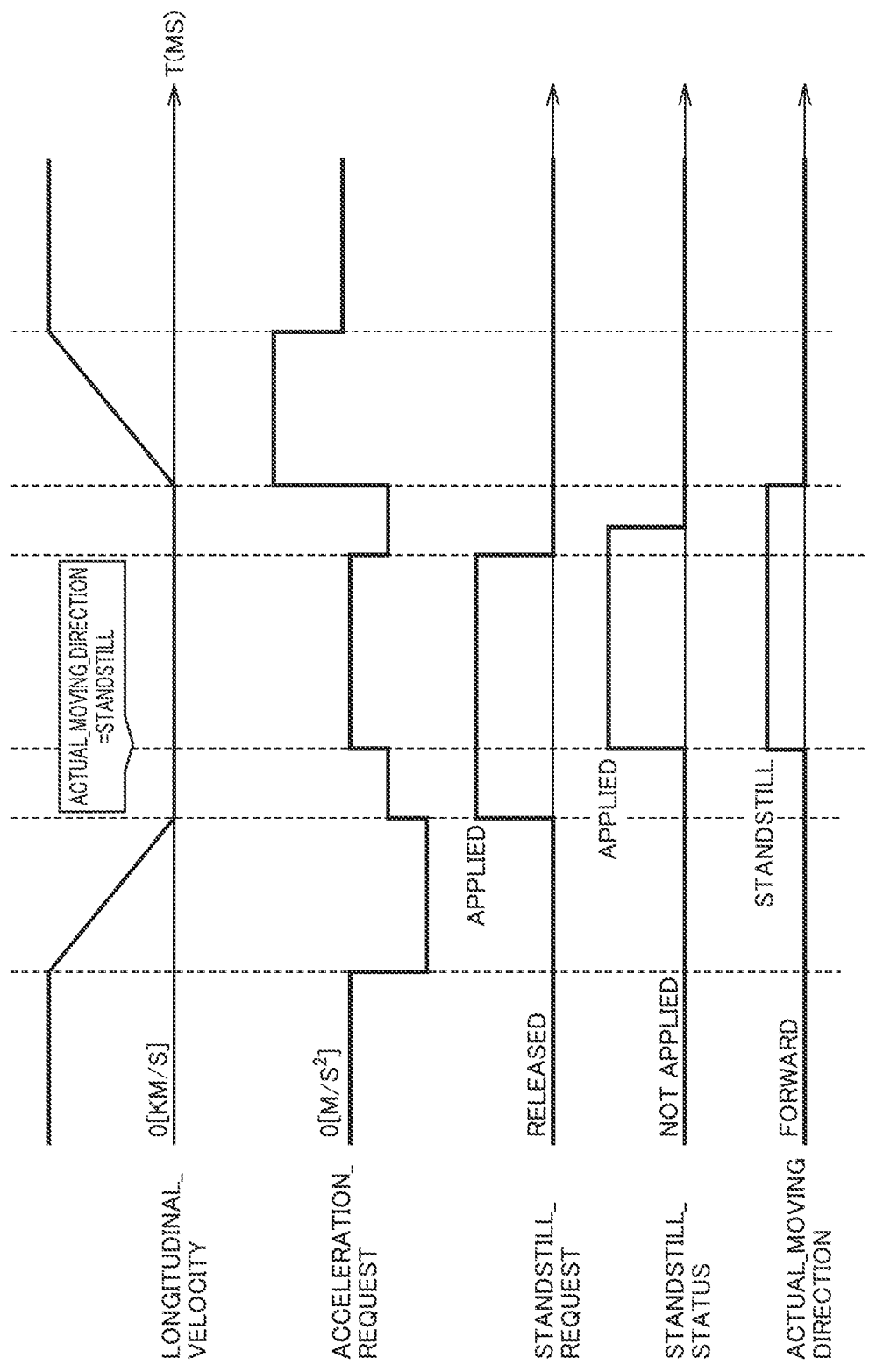

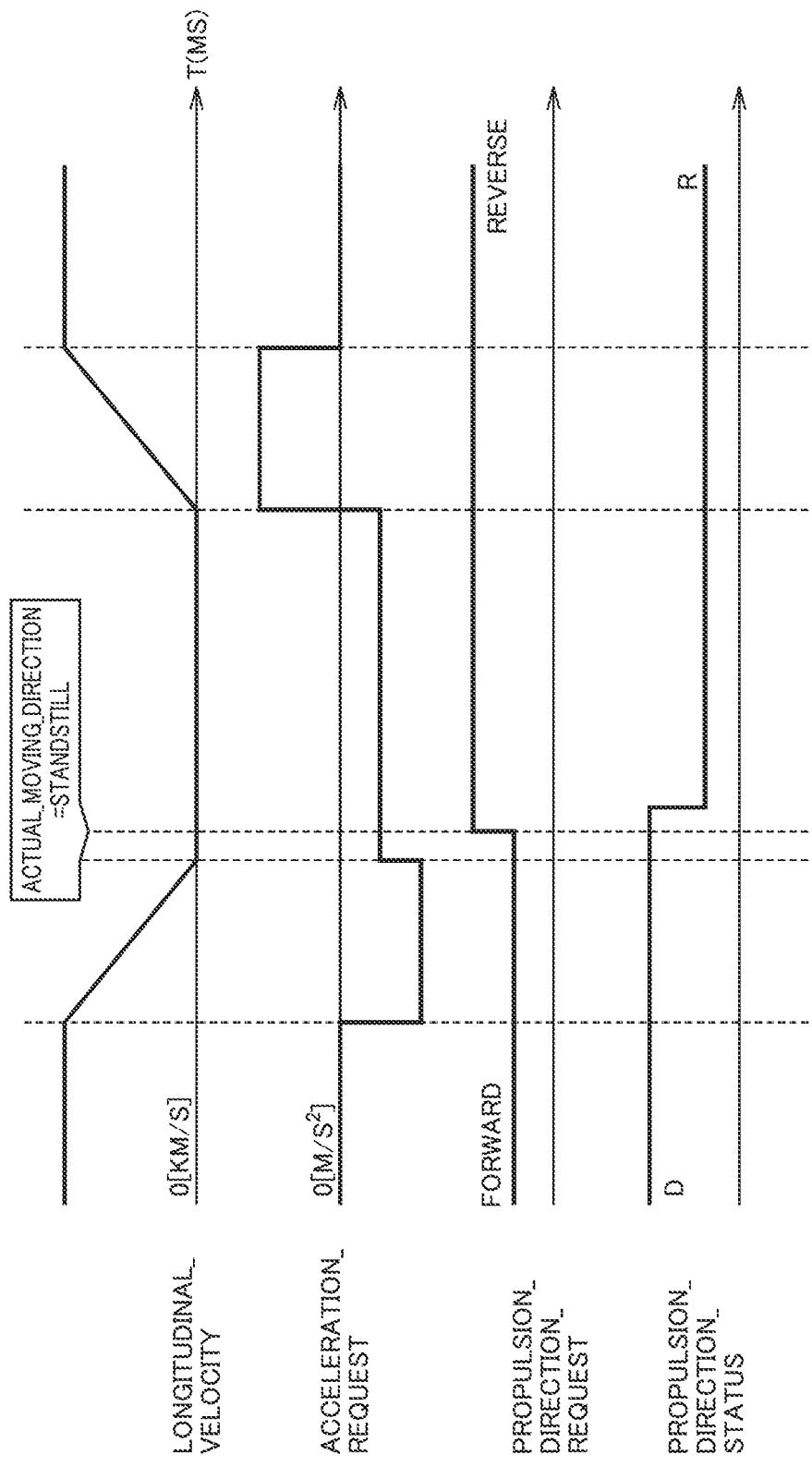

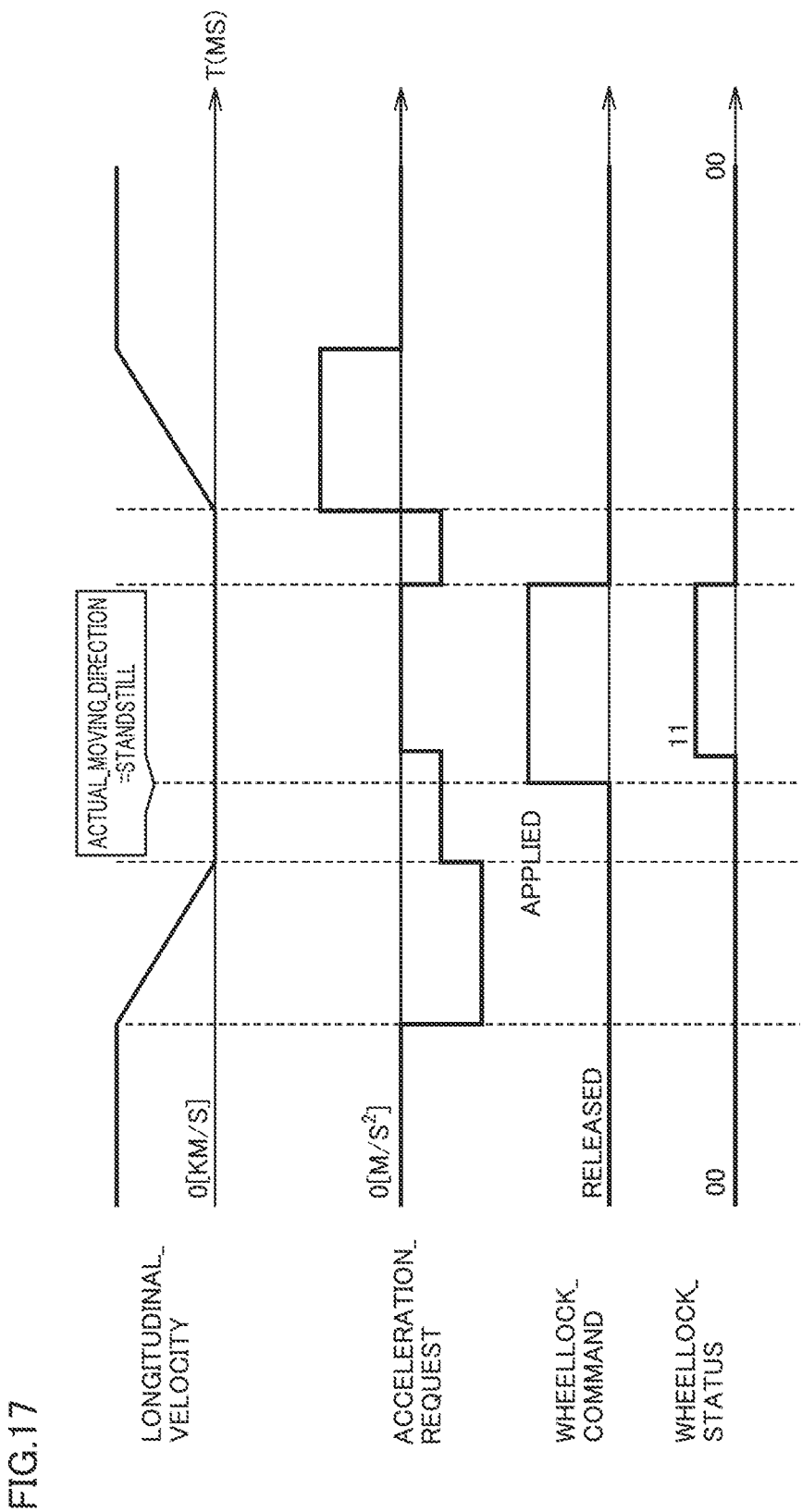

VEHICLE

This is a continuation of U.S. application Ser. No. 17/659,541, filed on Apr. 18, 2022, which is a continuation of U.S. application Ser. No. 17/153,930, filed on Jan. 21, 2021, which is based on Japanese Patent Application No. 2020-015727 filed with the Japan Patent Office on Jan. 31, 2020, the entire contents of which are hereby incorporated by reference.

BACKGROUND

Field

The present disclosure relates to a vehicle capable of autonomous driving.

Description of the Background Art

A technique relating to autonomous driving of a vehicle has recently been developed. For example, Japanese Patent Laying-Open No. 2018-132015 discloses a vehicle including a motive power system that manages motive power of the vehicle in a centralized manner, a power supply system that manages supply of electric power to various vehicle-mounted devices in a centralized manner, and an autonomous driving system that carries out autonomous driving control of the vehicle in a centralized manner.

SUMMARY

While autonomous driving is being carried out, a vehicle is controlled in accordance with an instruction from an autonomous driving system. While autonomous driving is being carried out, various devices such as a headlight, a hazard light, a front windshield wiper, and a rear windshield wiper can also be controlled in accordance with an instruction from the autonomous driving system.

Determination as to operations by the various devices (for example, timing of turn-on of the headlight or operation timing of the front windshield wiper) may be different among users. Therefore, during autonomous driving, determination by the autonomous driving system as to operations by the various devices and determination as to operations by the various devices by the user who is in a vehicle may be different from each other. When the various devices are controlled in accordance with determination by the autonomous driving system in such a case, the user may feel uncomfortable.

The present disclosure was made to solve the problem above, and an object of the present disclosure is to suppress uncomfortable feeling given to a user during autonomous driving due to a difference in determination as to operations by various devices between an autonomous driving system and the user.

(1) A vehicle according to the present disclosure is a vehicle on which an autonomous driving system is mountable, and the vehicle includes a vehicle platform that controls the vehicle in accordance with an instruction from the autonomous driving system and a vehicle control interface that interfaces between the vehicle platform and the autonomous driving system. The vehicle platform includes a headlight system, a hazard light system, a front windshield wiper system, and a rear windshield wiper system. The vehicle platform sets an operation mode of each of the headlight system, the hazard light system, the front windshield wiper system, and the rear windshield wiper system in accordance with an operation mode request for each of the headlight system, the hazard light system, the front windshield wiper system, and the rear windshield wiper system received from the autonomous driving system and/or an operation by a user onto an operation apparatus provided for each of the headlight system, the hazard light system, the front windshield wiper system, and the rear windshield wiper system. The vehicle platform sets the operation mode with the operation by the user being prioritized over the operation mode request.

According to the configuration, for setting of the operation mode of the headlight system, the hazard light system, the front windshield wiper system, and the rear windshield wiper system, an operation by a user is prioritized over an operation mode request from the autonomous driving system. Thus, even during autonomous driving, the user can set the operation mode of the headlight system, the hazard light system, the front windshield wiper system, and the rear windshield wiper system. Therefore, uncomfortable feeling given to the user during autonomous driving can be suppressed.

(2) In one embodiment, when the operation mode of the headlight system has been set to a first prescribed mode by the operation by the user, the vehicle platform sets the operation mode of the headlight system in accordance with the operation mode request.

(3) In one embodiment, when the operation mode of the headlight system has been set to a mode other than the first prescribed mode by the operation by the user, the vehicle platform does not set the operation mode of the headlight system in accordance with the operation mode request.

(4) In one embodiment, the first prescribed mode includes an OFF mode and an AUTO mode. The OFF mode is a mode in which a headlight is turned off. The AUTO mode is a mode in which the operation mode of the headlight system is automatically set by the vehicle platform.

According to the configuration in (2) to (4), an operation mode request from the autonomous driving system is accepted only when the operation mode of the headlight system has been set to the first prescribed mode (the OFF mode or the AUTO mode) by the operation by the user. When the user has set the operation mode of the headlight system to the OFF mode or the AUTO mode, the user is estimated to have left setting of the operation mode of the headlight system to the autonomous driving system or the vehicle. Therefore, by accepting the operation mode request from the autonomous driving system only in such a case, uncomfortable feeling given to the user can be suppressed.

(5) In one embodiment, when the operation mode of the front windshield wiper system has been set to a second prescribed mode by the operation by the user, the vehicle platform sets the operation mode of the front windshield wiper system in accordance with the operation mode request.

(6) In one embodiment, when the operation mode of the front windshield wiper system has been set to a mode other than the second prescribed mode by the operation by the user, the vehicle platform does not set the operation mode of the front windshield wiper system in accordance with the operation mode request.

(7) In one embodiment, the second prescribed mode includes an OFF mode and an Auto mode. The OFF mode is a mode in which a front windshield wiper is stopped. The Auto mode is a mode in which the operation mode of the front windshield wiper system is automatically set by the vehicle platform.

According to the configuration in (5) to (7), the operation mode request from the autonomous driving system is accepted only when the operation mode of the front windshield wiper system has been set to the second prescribed mode (the OFF mode or the Auto mode) by the operation by the user. When the user has set the operation mode of the front windshield wiper system to the OFF mode or the Auto mode, the user is estimated to have left setting of the operation mode of the front windshield wiper system to the autonomous driving system or the vehicle. Therefore, by accepting the operation mode request from the autonomous driving system only in such a case, uncomfortable feeling given to the user can be suppressed.

(8) In one embodiment, the front windshield wiper system includes as the operation mode, an intermittent operation mode in which a front windshield wiper is intermittently operated. When the operation mode of the front windshield wiper system has been set to the intermittent operation mode, the vehicle platform sets an operation interval in accordance with an operation interval request that indicates the operation interval of the front windshield wiper in the intermittent operation mode received from the autonomous driving system and/or the operation by the user onto the operation apparatus. The vehicle platform sets the operation interval with the operation by the user being prioritized over the operation interval request.

According to the configuration, for setting of the operation interval of the front windshield wiper in the intermittent operation mode, the operation by the user is prioritized over the operation interval request from the autonomous driving system. Thus, even during autonomous driving, the user can set the operation interval of the front windshield wiper in the intermittent operation mode. Therefore, uncomfortable feeling given to the user during autonomous driving can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram for illustrating a light operation mode request.

FIG. 5 is a diagram for illustrating a hazard light operation mode request.

FIG. 7 is a diagram for illustrating a front windshield wiper operation mode request.

FIG. 9 is a diagram for illustrating a front windshield wiper operation interval request in an intermittent operation mode.

FIG. 10 is a diagram for illustrating a rear windshield wiper operation mode request.

FIG. 14 is a diagram showing a typical flow in an autonomous driving system.

FIG. 15 is a diagram showing an exemplary timing chart of an API relating to stop and start of the MaaS vehicle.

FIG. 16 is a diagram showing an exemplary timing chart of the API relating to shift change of the MaaS vehicle.

FIG. 17 is a diagram showing an exemplary timing chart of the API relating to wheel lock of the MaaS vehicle.

DESCRIPTION OF THE PREFERRED EMBODIMENTS

Figure 1:
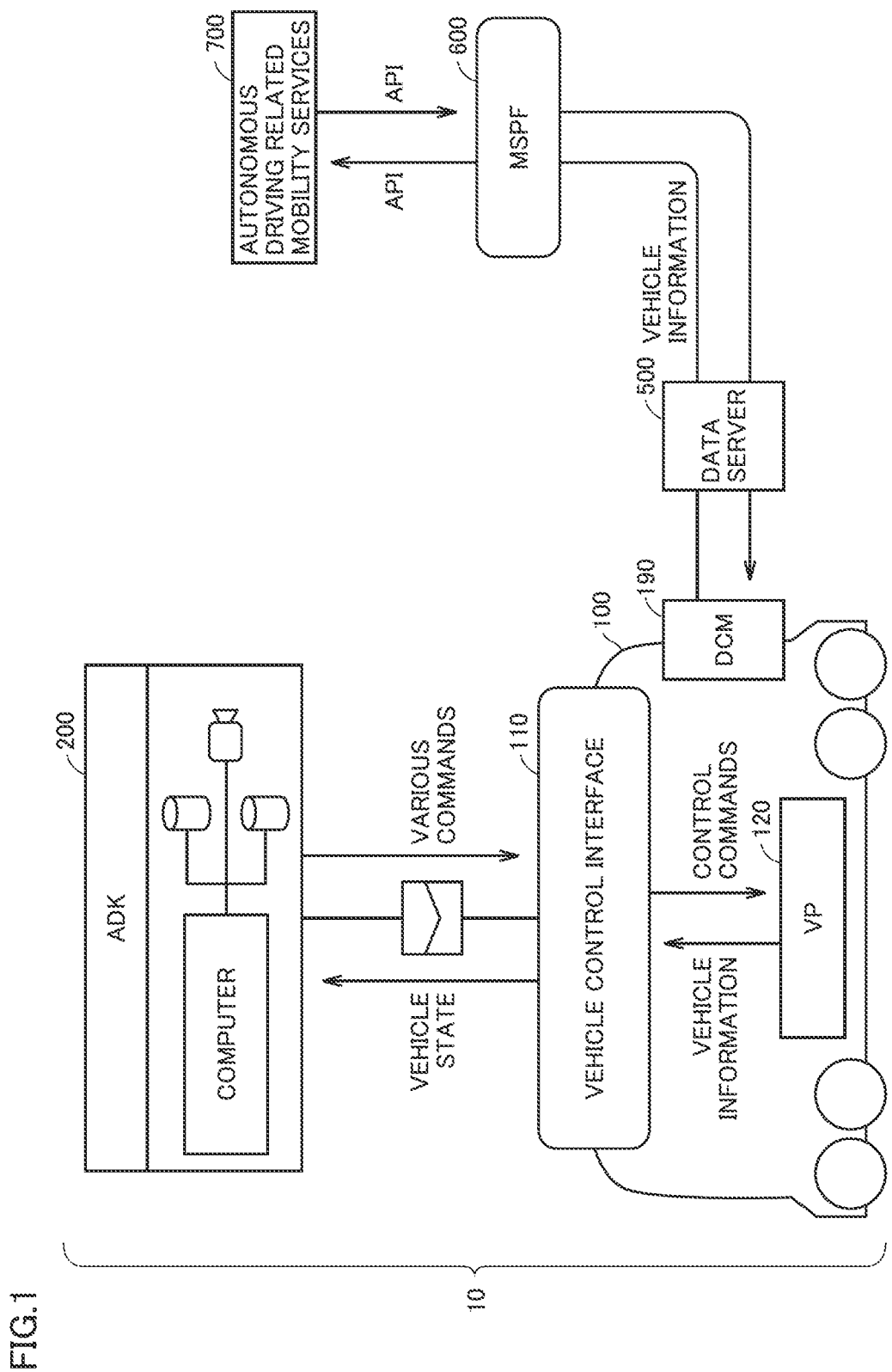
FIG. 1 is a diagram showing overview of a MaaS system in which a vehicle according to an embodiment of the present disclosure is used.

An embodiment of the present disclosure will be described below in detail with reference to the drawings. The same or corresponding elements in the drawings have the same reference characters allotted and description thereof will not be repeated.

<Overall Configuration>

FIG. 1 is a diagram showing overview of a mobility as a service (MaaS) system in which a vehicle according to an embodiment of the present disclosure is used.

Referring to FIG. 1, this MaaS system includes a vehicle 10, a data server 500, a mobility service platform (which is also referred to as "MSPF" below) 600, and autonomous driving related mobility services 700.

Vehicle 10 includes a vehicle main body 100 and an autonomous driving kit (which is also referred to as "ADK" below) 200. Vehicle main body 100 includes a vehicle control interface 110, a vehicle platform (which is also referred to as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by manual driving by a user. In this case, VP 120 carries out travel control (travel control in accordance with an operation by a user) in a manual mode.

Vehicle control interface 110 can communicate with ADK 200 over a controller area network (CAN) or Ethernet®. Vehicle control interface 110 receives various commands from ADK 200 by executing a prescribed application program interface (API) defined for each communicated signal. Vehicle control interface 110 provides a state of vehicle main body 100 to ADK 200 by executing a prescribed API defined for each communicated signal.

When vehicle control interface 110 receives a command from ADK 200, it outputs a control command corresponding to the command to VP 120. Vehicle control interface 110 obtains various types of information on vehicle main body 100 from VP 120 and outputs the state of vehicle main body 100 to ADK 200. A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is also referred to as "ADS" below) for autonomous driving of vehicle 10. ADK 200 creates, for example, a driving plan of vehicle 10 and outputs various commands for traveling vehicle 10 in accordance with the created driving plan to vehicle control interface 110 in accordance with the API defined for each command. ADK 200 receives various signals indicating states of vehicle main body 100 from vehicle control interface 110 in accordance with the API defined for each signal and has the received vehicle state reflected on creation of the driving plan. A configuration of ADK 200 (ADS) will also be described later.

DCM 190 includes a communication interface for vehicle main body 100 to wirelessly communicate with data server 500. DCM 190 outputs various types of vehicle information such as a speed, a position, or an autonomous driving state to data server 500. DCM 190 receives from autonomous driving related mobility services 700 through MSPF 600 and data server 500, for example, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 and/or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS. An ADS provider can use as the APIs, the data on the vehicle states and vehicle control necessary for development of the ADS stored in data server 500.

<Configuration of Vehicle>

Figure 2:
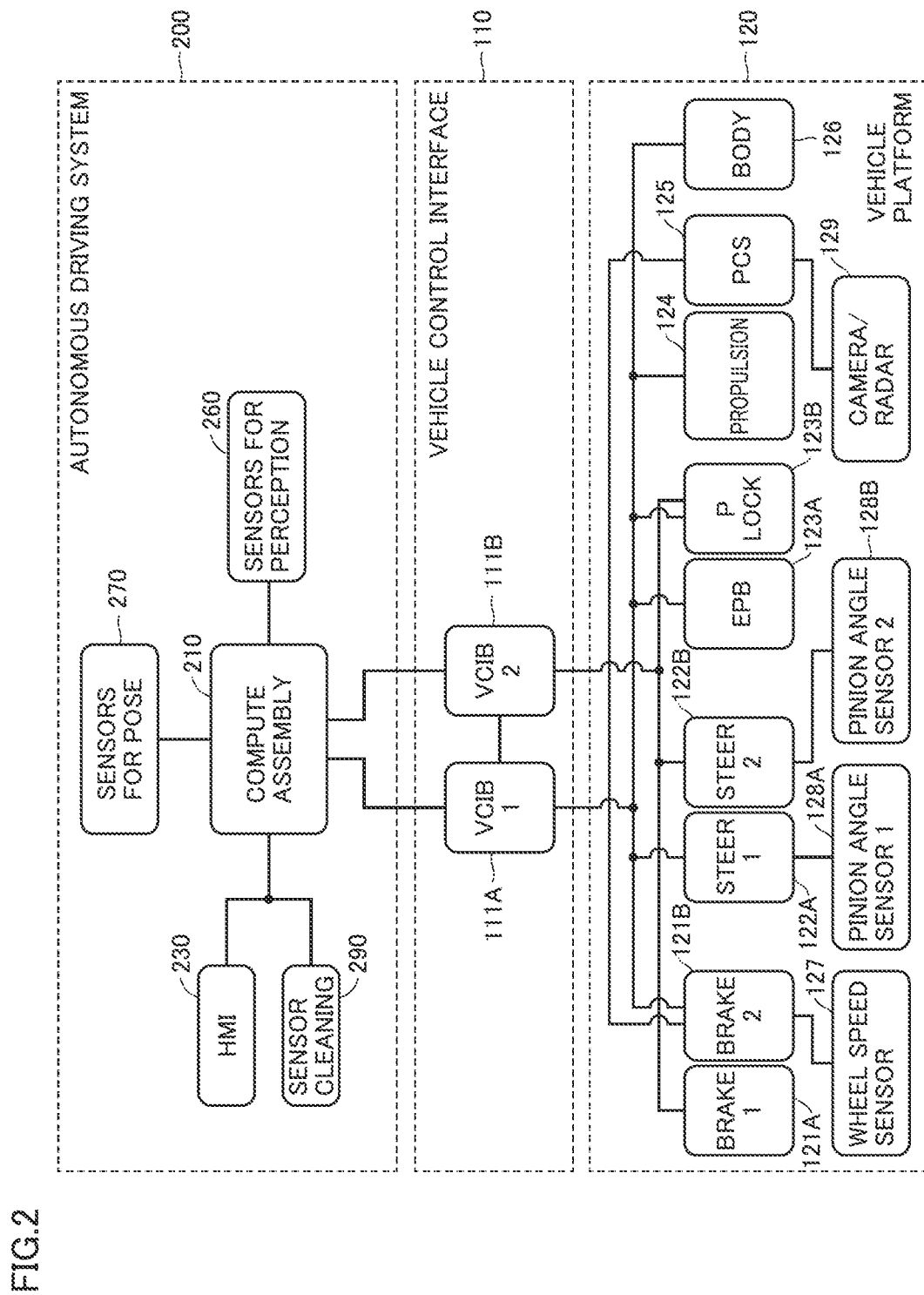
FIG. 2 is a diagram showing a detailed configuration of a vehicle control interface, a VP, and an ADK.

FIG. 2 is a diagram showing a detailed configuration of vehicle control interface 110, VP 120, and ADK 200. Referring to FIG. 2, ADK 200 includes a compute assembly 210, a human machine interface (HMI) 230, sensors for perception 260, sensors for pose 270, and a sensor cleaning 290.

During autonomous driving of vehicle 10, compute assembly 210 obtains information on an environment around the vehicle and a pose, a behavior, and a position of vehicle 10 with various sensors which will be described later. Compute assembly 210 obtains a state of vehicle 10 from VP 120 through vehicle control interface 110 and sets a next operation (acceleration, deceleration, or turning) of vehicle 10. Compute assembly 210 outputs various instructions for realizing a set next operation of vehicle 10 to vehicle control interface 110.

HMI 230 accepts an input operation from a user for vehicle 10. HMI 230 can accept, for example, an input by a touch operation onto a display screen and/or an audio input. HMI 230 presents information to a user of vehicle 10 by showing information on the display screen. HMI 230 may present information to the user of vehicle 10 by voice and sound in addition to or instead of representation of information on the display screen. HMI 230 provides information to the user and accepts an input operation, for example, during autonomous driving, during manual driving by a user, or at the time of transition between autonomous driving and manual driving.

Sensors for perception 260 include sensors that perceive an environment around the vehicle, and are implemented, for example, by at least any of laser imaging detection and ranging (LIDAR), a millimeter-wave radar, and a camera.

The LIDAR measures a distance based on a time period from emission of pulsed laser beams (infrared rays) until return of the emitted beams reflected by an object. The millimeter-wave radar measures a distance and/or a direction to an object by emitting radio waves short in wavelength to the object and detecting radio waves that are reflected and return from the object. The camera is arranged, for example, on a rear side of a room mirror in a compartment and shoots an image of the front of vehicle 10. As a result of image processing onto images shot by the camera, another vehicle, an obstacle, or a human in front of vehicle 10 can be recognized. Information obtained by sensors for perception 260 is output to compute assembly 210.

Sensors for pose 270 detect a pose, a behavior, or a position of vehicle 10. Sensors for pose 270 include, for example, an inertial measurement unit (IMU) and a global positioning system (GPS).

The IMU detects, for example, an acceleration in a front-rear direction, a lateral direction, and a vertical direction of vehicle 10 and an angular velocity in a roll direction, a pitch direction, and a yaw direction of vehicle 10. The GPS detects a position of vehicle 10 based on information received from a plurality of GPS satellites that orbit the Earth. Information obtained by sensors for pose 270 is output to compute assembly 210.

Sensor cleaning 290 can remove soiling attached to various sensors. Sensor cleaning 290 removes soiling on a lens of the camera or a portion from which laser beams and/or radio waves are emitted, for example, with a cleaning solution and/or a wiper.

Vehicle control interface 110 includes a vehicle control interface box (VCIB) 111A and a VCIB 111B. Each of VCIBs 111A and 111B includes an electronic control unit (ECU), and specifically contains a central processing unit (CPU) and a memory (a read only memory (ROM) and a random access memory (RAM)) (neither of which is shown). VCIB 111A and VCIB 111B are basically equivalent in function to each other. VCIB 111A and VCIB 111B are partially different from each other in a plurality of systems connected thereto that make up VP 120.

Each of VCIBs 111A and 111B is communicatively connected to compute assembly 210 of ADK 200 over the CAN or the like. VCIB 111A and VCIB 111B are communicatively connected to each other.

Each of VCIBs 111A and 111B relays various instructions from ADK 200 and provides them as control commands to VP 120. More specifically, each of VCIBs 111A and 111B executes a program stored in a memory, converts various instructions provided from ADK 200 into control commands to be used for control of each system of VP 120, and provides the converted control commands to a destination system. Each of VCIBs 111A and 111B processes or relays various types of vehicle information output from VP 120 and provides the vehicle information as a vehicle state to ADK 200.

For at least one of systems of VP 120 such as a brake system and a steering system, VCIBs 111A and 111B are configured to be equivalent in function to each other so that control systems between ADK 200 and VP 120 are redundant. Therefore, when some kind of failure occurs in a part of the system, the function (turning or stopping) of VP 120 can be maintained by switching between the control systems as appropriate or disconnecting a control system where failure has occurred.

VP 120 includes brake systems 121A and 121B, steering systems 122A and 122B, an electric parking brake (EPB) system 123A, a P-Lock system 123B, a propulsion system 124, a pre-crash safety (PCS) system 125, and a body system 126.

Brake system 121B, steering system 122A, EPB system 123A, P-Lock system 123B, propulsion system 124, and body system 126 of the plurality of systems of VP 120 are communicatively connected to VCIB 111A through a communication bus.

Brake system 121A, steering system 122B, and P-Lock system 123B of the plurality of systems of VP 120 are communicatively connected to VCIB 111B through a communication bus.

Brake systems 121A and 121B can control a plurality of braking apparatuses (not shown) provided in wheels of vehicle 10. The braking apparatus includes, for example, a disc brake system that is operated with a hydraulic pressure regulated by an actuator. Brake system 121A and brake system 121B may be equivalent in function to each other. Alternatively, any one of brake systems 121A and 121B may be able to independently control braking force of each wheel and the other thereof may be able to control braking force such that equal braking force is generated in the wheels.

A wheel speed sensor 127 is connected to brake system 121B. Wheel speed sensor 127 is provided in each wheel of vehicle 10. Wheel speed sensor 127 detects a rotation speed and a rotation direction of a wheel. Wheel speed sensor 127 outputs the detected rotation speed and rotation direction of the wheel to brake system 121B. For example, wheel speed sensor 127 provides pulses different between during rotation in a direction of forward travel of vehicle 10 and during rotation in a direction of rearward travel of vehicle 10. Brake system 121B fixes or confirms the rotation direction of each wheel based on the pulses from wheel speed sensor 127. Then, brake system 121B provides information indicating the fixed rotation direction of each wheel to VCIB 111A.

Brake system 121B determines whether or not vehicle 10 has come to a standstill based on the fixed rotation direction of each wheel. Specifically, when the speed of all wheels is set to zero and when a certain time period has elapsed since the speed of all wheels was set to 0, brake system 121B determines that vehicle 10 has come to a standstill. When brake system 121B determines that vehicle 10 has come to a standstill, the brake system provides information indicating "Standstill" to VCIB 111A.

Each of brake systems 121A and 121B receives a command from ADK 200 as a control command through vehicle control interface 110 and generates a braking instruction to the braking apparatus in accordance with the control command. For example, brake systems 121A and 121B control the braking apparatus based on a braking instruction generated in one of brake systems 121A and 121B, and when a failure occurs in one of the brake systems, the braking apparatus is controlled based on a braking instruction generated in the other brake system.

Steering systems 122A and 122B can control a steering angle of a steering wheel of vehicle 10 with a steering apparatus (not shown). The steering apparatus includes, for example, rack-and-pinion electric power steering (EPS) that allows adjustment of a steering angle by an actuator.

Steering systems 122A and 122B are equivalent in function to each other. Each of steering systems 122A and 122B receives a command from ADK 200 as a control command through vehicle control interface 110 and generates a steering instruction to the steering apparatus in accordance with the control command. For example, steering systems 122A and 122B control the steering apparatus based on the steering instruction generated in one of steering systems 122A and 122B, and when a failure occurs in one of the steering systems, the steering apparatus is controlled based on a steering instruction generated in the other steering system.

A pinion angle sensor 128A is connected to steering system 122A. A pinion angle sensor 128B is connected to steering system 122B. Each of pinion angle sensors 128A and 128B detects an angle of rotation (a pinion angle) of a pinion gear coupled to a rotation shaft of the actuator. Pinion angle sensors 128A and 128B output detected pinion angles to steering systems 122A and 122B, respectively.

EPB system 123A can control an EPB (not shown) provided in at least any of wheels. The EPB is provided separately from the braking apparatus, and fixes a wheel by an operation of an actuator. The EPB, for example, activates a drum brake for a parking brake provided in at least one of wheels of vehicle 10 to fix the wheel. The EPB activates a braking apparatus to fix a wheel, for example, with an actuator capable of regulating a hydraulic pressure to be supplied to the braking apparatus separately from brake systems 121A and 121B. EPB system 123A receives a command from ADK 200 as a control command through vehicle control interface 110 and controls the EPB in accordance with the control command.

P-Lock system 123B can control a P-Lock apparatus (not shown) provided in a transmission of vehicle 10. The P-Lock apparatus fixes rotation of an output shaft of the transmission by fitting a protrusion provided at a tip end of a parking lock pawl into a tooth of a gear (locking gear) provided as being coupled to a rotational element in the transmission. A position of the parking lock pawl is adjusted by an actuator. P-Lock system 123B receives a command from ADK 200 as a control command through vehicle control interface 110 and controls the P-Lock apparatus in accordance with the control command.

Propulsion system 124 can switch a shift range with the use of a shift apparatus (not shown) and can control driving force of vehicle 10 in a direction of travel that is generated from a drive source (not shown). The shift apparatus can select any of a plurality of shift ranges. The drive source includes, for example, a motor generator and/or an engine. Propulsion system 124 receives a command from ADK 200 as a control command through vehicle control interface 110 and controls the shift apparatus and the drive source in accordance with the control command.

PCS system 125 is communicatively connected to brake system 121B. PCS system 125 carries out control to avoid collision of vehicle 10 or to mitigate damage by using a result of detection by a camera/radar 129. For example, PCS system 125 detects an object in front and determines whether or not vehicle 10 may collide with the object based on a distance to the object. When PCS system 125 determines that there is possibility of collision with the object, it outputs a braking instruction to brake system 121B so as to increase braking force.

Body system 126 controls, for example, various devices in accordance with a state or an environment of travel of vehicle 10. The various devices include, for example, a direction indicator, a headlight, a hazard light, a horn, a front windshield wiper, and a rear windshield wiper. Body system 126 receives a command from ADK 200 as a control command through vehicle control interface 110 and controls the various devices in accordance with the control command. The various devices are each separately provided with an operation apparatus manually operable by a user (a driver).

Determination as to operations by the various devices (for example, timing of turn-on of the headlight or operation timing of the front windshield wiper) may be different among users. Therefore, during autonomous driving, determination by ADK 200 as to operations by the various devices may be different from determination as to operations by the various devices by the user who is in vehicle 10. When the various devices are controlled in accordance with determination by ADK 200 in such a case, the user may feel uncomfortable. Then, in the present embodiment, when an operation is performed by the user onto the operation apparatus for each of the headlight, the hazard light, the front windshield wiper, and the rear windshield wiper among the various devices, the operation by the user is prioritized over an instruction (a command) from ADK 200. By prioritizing the operation by the user, uncomfortable feeling given to the user can be suppressed. Details of the headlight, the hazard light, the front windshield wiper, and the rear windshield wiper will sequentially be described below.

<Headlight>

The headlight includes a "TAIL mode," a "HEAD mode," an "AUTO mode," a "HI mode," and an "OFF mode" as operation modes. The "TAIL mode" refers to a mode in which a parking light (a sidelight) is turned on. The "HEAD mode" refers to a mode in which the headlight is turned on and set to low beam. The "AUTO mode" refers to a mode in which VP 120 (body system 126 in the present embodiment) automatically sets the operation mode based on brightness around vehicle 10. The "HI mode" refers to a mode in which the headlight is turned on and set to high beam. The "OFF mode" refers to a mode in which the headlight is turned off.

The user can set the operation mode of the headlight by performing an operation onto the operation apparatus (for example, a light switch). The operation apparatus provides to VP 120 (body system 126) every prescribed control cycle, a signal (which is also referred to as "a first driver input (Headlight_Driver_Input) below) indicating the operation mode (which is also referred to as a "first driver setting mode" below) of the headlight set by the operation by the user. VP 120 recognizes the first driver setting mode based on the first driver input received from the operation apparatus.

When the first driver setting mode indicates the "OFF mode" or the "AUTO mode," VP 120 accepts a command from ADK 200. This is because, when the user has set the operation mode of the headlight system to the OFF mode or the AUTO mode, the user is estimated to have left setting of the operation mode of the headlight system to ADK 200 or vehicle main body 100. Specifically, ADK 200 provides a light operation mode request (Headlight_Mode_Command) indicating an illumination state of the headlight to vehicle control interface 110 every prescribed control cycle. Vehicle control interface 110 that has received the light operation mode request generates a control command corresponding to the light operation mode request and provides the generated control command to VP 120 (body system 126). That is, Headlight_Mode_Command is a command to control the headlight mode of the vehicle platform (VP 120). When the first driver setting mode indicates the "OFF mode" or the "AUTO mode," VP 120 sets the operation mode of the headlight in accordance with the control command. When the first driver setting mode indicates neither the "OFF mode" nor the "AUTO mode," that is, when the first driver setting mode indicates the "TAIL mode," the "HEAD mode," or the "HI mode," VP 120 does not accept a command from ADK 200. A value corresponding to the operation mode requested by ADK 200 is set in the light operation mode request provided from ADK 200 in accordance with contents in FIG. 3 which will be described below.

FIG. 3 is a diagram for illustrating a light operation mode request. FIG. 3 shows relation between a light operation mode request and a corresponding value. Specifically, a value is shown in a field "value" and a light operation mode request is shown in a field "Description". Remarks are given in a field "remarks".

Referring to FIG. 3, a value 0 indicates that "there is no request (No request)." Though detailed description will be provided later, the value 0 is set when a current operation mode is maintained. A value 1 indicates a "TAIL mode request." A value 2 indicates a "HEAD mode request." A value 3 indicates an "AUTO mode request." A value 4 indicates a "HI mode request." A value 5 indicates an "OFF mode request." Though values 6 and 7 are not used in the present embodiment, they can also be set and used as appropriate.

When vehicle control interface 110 receives the light operation mode request from ADK 200, it generates a control command corresponding to a value indicated in the light operation mode request and provides the control command to VP 120. When the light operation mode request indicates the value 0, vehicle control interface 110 generates a control command indicating "No request" and provides the control command to VP 120. When the light operation mode request indicates the value 1, vehicle control interface 110 generates a control command indicating the "TAIL mode request" and provides the control command to VP 120. When the light operation mode request indicates the value 2, vehicle control interface 110 generates a control command indicating the "HEAD mode request" and provides the control command to VP 120. When the light operation mode request indicates the value 3, vehicle control interface 110 generates a control command indicating the "AUTO mode request" and provides the control command to VP 120. When the light operation mode request indicates the value 4, vehicle control interface 110 generates a control command indicating the "HI mode request" and provides the control command to VP 120. When the light operation mode request indicates the value 5, vehicle control interface 110 generates a control command indicating the "OFF mode request" and provides the control command to VP 120.

When the first driver setting mode indicates the "OFF mode" or the "AUTO mode," VP 120 accepts a control command. When the first driver setting mode does not indicate the "OFF mode" or the "AUTO mode," that is, when the first driver setting mode indicates the "TAIL mode," the "HEAD mode," or the "HI mode," VP 120 does not accept the control command. While the first driver setting mode indicates the "OFF mode" or the "AUTO mode," VP 120 sets the operation mode of the headlight to the "TAIL mode" when it receives the control command indicating the "TAIL mode request," VP 120 sets the operation mode of the headlight to the "HEAD mode" when it receives the control command indicating the "HEAD mode request," VP 120 sets the operation mode of the headlight to the "AUTO mode" when it receives the control command indicating the "AUTO mode request," VP 120 sets the operation mode of the headlight to the "HI mode" when it receives a control command indicating the "HI mode request," and VP 120 sets the operation mode of the headlight to the "OFF mode" when it receives a control command indicating the "OFF mode request."

When VP 120 receives the control command indicating "No request" while the first driver setting mode indicates the "OFF mode" or the "AUTO mode," it maintains the current operation mode.

When the user has changed the first driver setting mode by performing an operation onto the operation apparatus, VP 120 sets the operation mode of the headlight not in accordance with the control command but in accordance with the changed first driver setting mode. In other words, VP 120 prioritizes the operation by the user (a first driver input) over the command from ADK 200.

Figure 4:
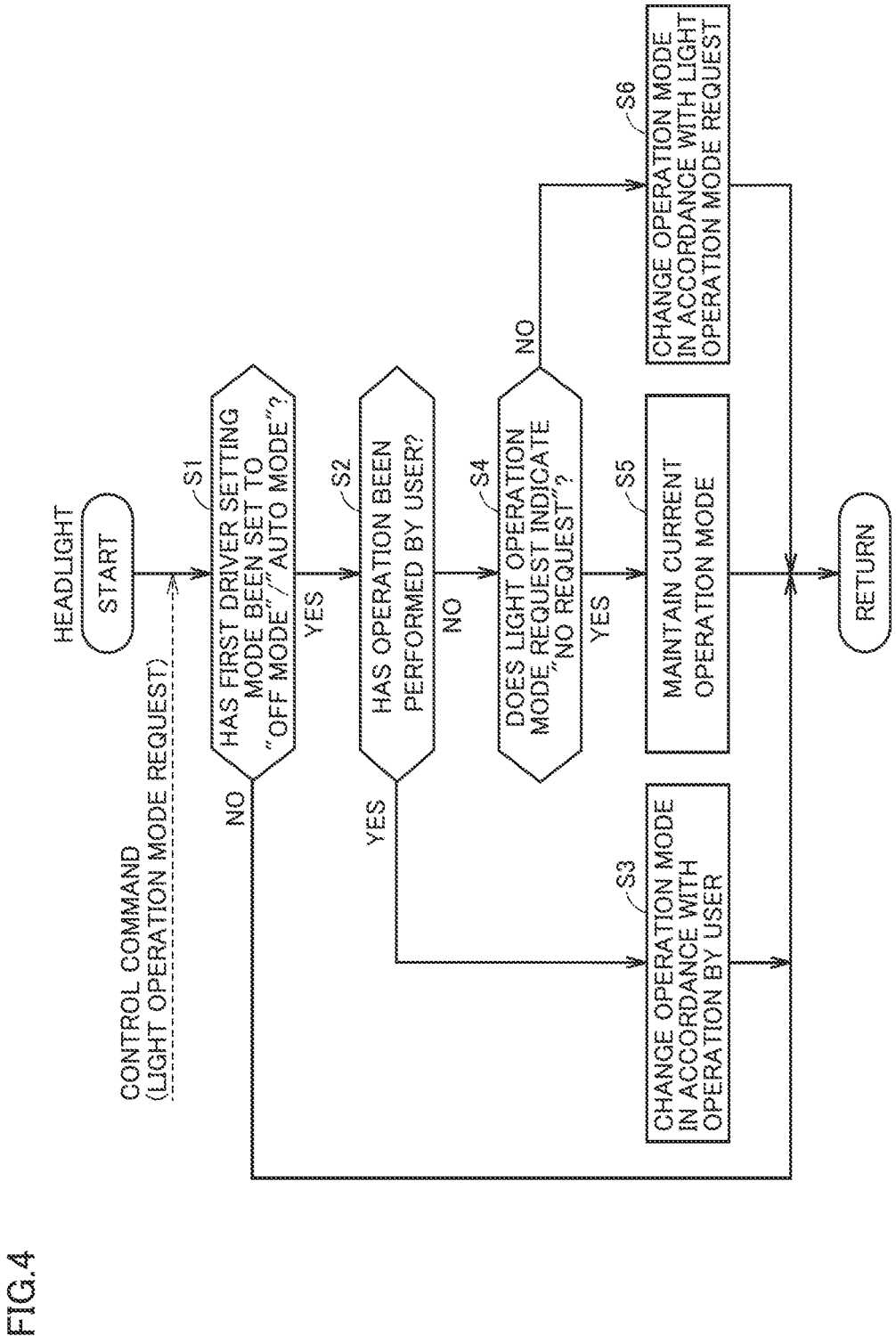
FIG. 4 is a flowchart showing a procedure of processing for setting an operation mode of a headlight.

FIG. 4 is a flowchart showing a procedure of processing for setting an operation mode of the headlight. Processing in the flowchart in FIG. 4 is repeatedly performed in VP 120 every prescribed control cycle. Though an example in which processing in the flowchart in FIG. 4 and FIGS. 6, 8, and 11 which will be described later is performed by software processing by VP 120 is described, a part or the entirety thereof may be implemented by hardware (electric circuitry) made in VP 120.

VP 120 determines whether or not the first driver setting mode indicates the "OFF mode" or the "AUTO mode" (a step 1, the step being abbreviated as "S" below). When the first driver setting mode indicates the "TAIL mode," the "HEAD mode," or the "HI mode" (NO in S1), VP 120 maintains the first driver setting mode as the operation mode of the headlight and the process returns. In other words, VP 120 does not accept a command from ADK 200.

When the first driver setting mode indicates the "OFF mode" or the "AUTO mode" (YES in S1), VP 120 determines whether or not the user has performed an operation onto the operation apparatus (S2). In other words, VP 120 determines whether or not the first driver setting mode has been changed.

When the user has performed an operation onto the operation apparatus (YES in S2), VP 120 changes the operation mode of the headlight to the first driver setting mode indicated by the operation by the user (S3).

When the user has not performed an operation onto the operation apparatus (NO in S2), VP 120 determines whether or not the light operation mode request from ADK 200 indicates "No request" (S4). VP 120 determines contents of the light operation mode request based on a control command from vehicle control interface 110.

When the light operation mode request indicates "No request" (YES in S4), VP 120 maintains the current operation mode (S5).

When the light operation mode request indicates a request other than "No request" (NO in S4), VP 120 changes the operation mode of the headlight to the operation mode indicated in the light operation mode request (S6).

As set forth above, when the first driver setting mode indicates the "OFF mode" or the "AUTO mode," VP 120 sets the operation mode of the headlight in accordance with the light operation mode request from ADK 200. By accepting the light operation mode request from ADK 200 only when the user is estimated to have left setting of the operation mode of the headlight system to ADK 200 or vehicle main body 100, uncomfortable feeling given to the user during autonomous driving can be suppressed. When the user has performed an operation onto the operation apparatus, VP 120 prioritizes the operation by the user over the light operation mode request from ADK 200. By prioritizing the operation by the user over determination by ADK 200 during autonomous driving, uncomfortable feeling given to the user during autonomous driving can be suppressed.

<Hazard Light>

The hazard light includes an "OFF mode" and an "ON mode" as operation modes. The "OFF mode" refers to a mode in which the hazard light is turned off. The "ON mode" refers to a mode in which the hazard light flashes.

The user can set the operation mode of the hazard light by performing an operation onto the operation apparatus (for example, a hazard light switch). The operation apparatus provides to VP 120 (body system 126) every prescribed control cycle, a signal (which is also referred to as a "second driver input" below) indicating the operation mode (which is also referred to as a "second driver setting mode" below) of the hazard light set by the operation by the user. VP 120 recognizes the second driver setting mode based on the second driver input received from the operation apparatus.

VP 120 accepts a command from ADK 200. Specifically, ADK 200 provides a hazard light operation mode request (Hazardlight_Mode_Command) indicating an illumination state of the hazard light to vehicle control interface 110 every prescribed control cycle. Vehicle control interface 110 that has received the hazard light operation mode request generates a control command corresponding to the hazard light operation mode request and provides the generated control command to VP 120 (body system 126). VP 120 sets the operation mode of the hazard light in accordance with the control command. That is, Hazardlight_Mode_Command is a command to control the hazardlight mode of the vehicle platform (VP 120). A value corresponding to the operation mode requested by ADK 200 is set in the hazard light operation mode request provided from ADK 200 in accordance with contents in FIG. 5 which will be described below.

FIG. 5 is a diagram for illustrating a hazard light operation mode request. FIG. 5 shows relation between a hazard light operation mode request and a corresponding value. Specifically, a value is shown in a field "value" and a hazard light operation mode request is shown in a field "Description". Remarks are given in a field "remarks".

Referring to FIG. 5, a value 0 indicates a command for the hazard light "OFF", that is, turn-off of the hazard light. A value 1 indicates a command for the hazard light "ON", that is, flashing of the hazard light.

When vehicle control interface 110 receives the hazard light operation mode request from ADK 200, it generates a control command corresponding to a value indicated in the hazard light operation mode request and provides the control command to VP 120. When the hazard light operation mode request indicates the value 0, vehicle control interface 110 generates a control command indicating "OFF" and provides the control command to VP 120. When the hazard light operation mode request indicates the value 1, vehicle control interface 110 generates a control command indicating "ON" and provides the control command to VP 120.

When VP 120 receives the control command indicating "OFF", it sets the operation mode of the hazard light to the "OFF mode," and when VP 120 receives the control command indicating "ON", it sets the operation mode of the hazard light to the "ON mode."

When the user has changed the second driver setting mode by performing an operation onto the operation apparatus, VP 120 sets the operation mode of the hazard light not in accordance with the control command but in accordance with the changed second driver setting mode. In other words, VP 120 prioritizes the operation by the user (a second driver input) over the command from ADK 200.

Figure 6:
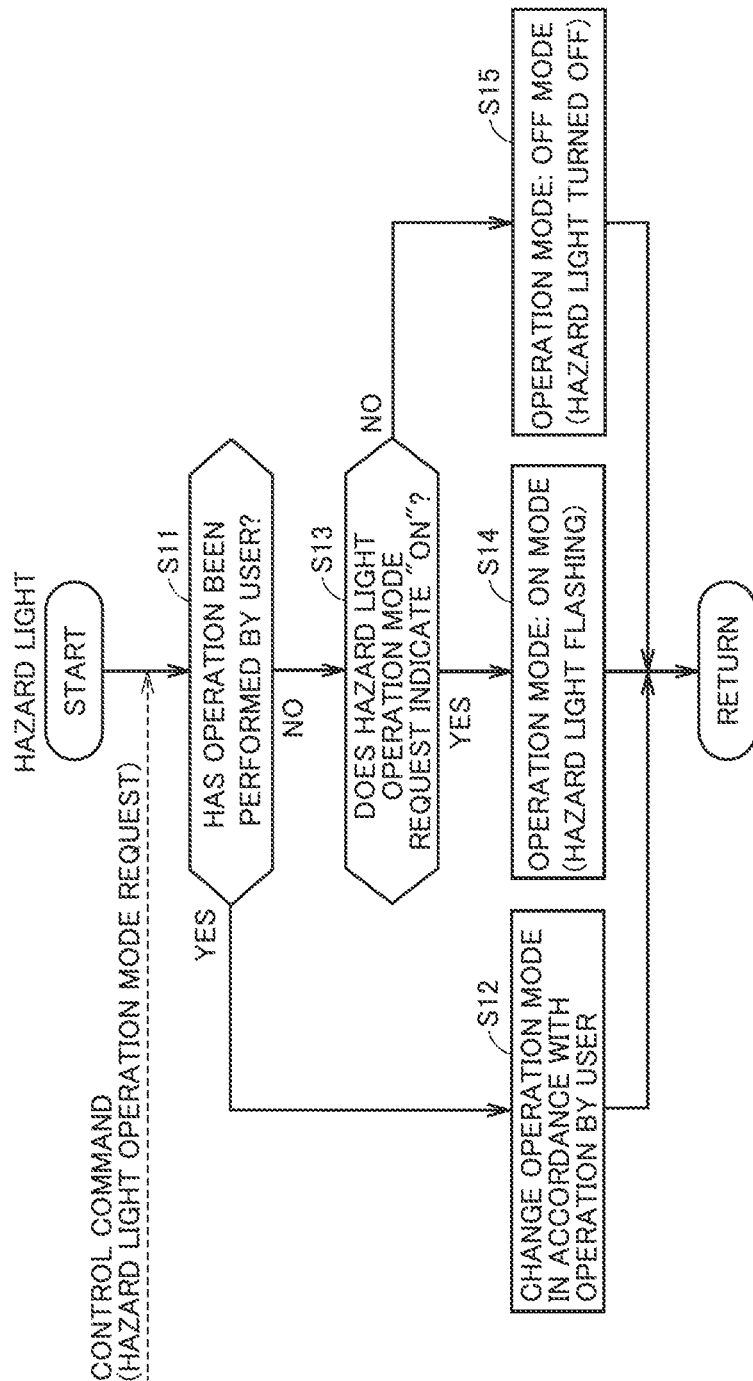
FIG. 6 is a flowchart showing a procedure of processing for setting an operation mode of a hazard light.

FIG. 6 is a flowchart showing a procedure of processing for setting an operation mode of the hazard light. Processing in the flowchart in FIG. 6 is repeatedly performed in VP 120 every prescribed control cycle.

VP 120 determines whether or not the user has performed an operation onto the operation apparatus (S11). In other words, VP 120 determines whether or not the second driver setting mode has been changed.

When the user has performed an operation onto the operation apparatus (YES in S11), VP 120 changes the operation mode of the hazard light to the second driver setting mode indicated by the operation by the user (S12).

When the user has not performed an operation onto the operation apparatus (NO in S11), VP 120 determines whether or not the hazard light operation mode request from ADK 200 indicates "ON" (S13). VP 120 determines contents of the hazard light operation mode request based on a control command from vehicle control interface 110.

When the hazard light operation mode request indicates "ON" (YES in S13), VP 120 sets the operation mode of the hazard light to the ON mode and has the hazard light flash (S14). When the hazard light operation mode request indicates "OFF" (NO in S13), VP 120 sets the operation mode of the hazard light to the OFF mode and turns off the hazard light (S15).

As set forth above, VP 120 changes the operation mode of the hazard light in accordance with the hazard light operation mode request from ADK 200. When the user has performed an operation, VP 120 prioritizes the operation by the user over the hazard light operation mode request from ADK 200. By prioritizing the operation by the user over determination by ADK 200 during autonomous driving, uncomfortable feeling given to the user during autonomous driving can be suppressed.

<Front Windshield Wiper>

The front windshield wiper includes an "OFF mode," a "Lo mode," a "Hi mode," an "intermittent operation mode," an "Auto mode," and a "Mist mode" as operation modes. The "OFF mode" refers to a mode in which the front windshield wiper is stopped. The "Lo mode" refers to a mode in which the front windshield wiper is operated at a first speed. The "Hi mode" refers to a mode in which the front windshield wiper is operated at a second speed higher than the first speed. The "intermittent operation mode" refers to a mode in which the front windshield wiper is intermittently operated. Though details will be described later, an operation interval of the front windshield wiper is set in the intermittent operation mode. The "Auto mode" refers to a mode in which VP 120 automatically selects the Lo mode or the Hi mode based on a result of detection by a raindrop sensor provided in a windshield. The "Mist mode" refers to a mode in which the front windshield wiper is activated only a prescribed number of times (for example, once).

The user can set the operation mode of the front windshield wiper by performing an operation onto the operation apparatus (for example, a windshield wiper switch). The operation apparatus provides to VP 120 (body system 126) every prescribed control cycle, a signal (which is also referred to as a "third driver input (Windshieldwiper_Front_Driver_Input)" below) indicating an operation mode (which is also referred to as a "third driver setting mode" below) of the front windshield wiper set by the operation by the user. VP 120 recognizes the third driver setting mode based on the third driver input.

When the third driver setting mode indicates the "OFF mode" or the "Auto mode," VP 120 accepts a command from ADK 200. This is because, when the user has set the operation mode of the front windshield wiper system to the OFF mode or the AUTO mode, the user is estimated to have left setting of the operation mode of the front windshield wiper system to ADK 200 or vehicle main body 100. Specifically, ADK 200 provides a front windshield wiper operation mode request (Windshieldwiper_Mode_Front_Command) that indicates an operation state of the front windshield wiper to vehicle control interface 110 every prescribed control cycle. Vehicle control interface 110 that has received the front windshield wiper operation mode request generates a control command corresponding to the front windshield wiper operation mode request and provides the generated control command to VP 120 (body system 126). That is, Windshieldwiper_Mode_Front_Command is a command to control the front windshield wiper of the vehicle platform (VP 120). When the third driver setting mode indicates the "OFF mode" or the "Auto mode," VP 120 sets the operation mode of the front windshield wiper in accordance with the control command. When the third driver setting mode indicates neither the "OFF mode" nor the "Auto mode," that is, when the third driver setting mode indicates the "Lo mode," the "Hi mode," the "intermittent operation mode," or the "Mist mode," VP 120 does not accept a command from ADK 200. A value corresponding to the operation mode requested by ADK 200 is set in the front windshield wiper operation mode request provided from ADK 200 in accordance with contents in FIG. 7 which will be described below.

FIG. 7 is a diagram for illustrating a front windshield wiper operation mode request. FIG. 7 shows relation between a front windshield wiper operation mode request and a corresponding value. Specifically, a value is shown in a field "value" and a front windshield wiper operation mode request is shown in a field "Description". Remarks are given in a field "remarks".

Referring to FIG. 7, a value 0 indicates a "stop request (an OFF mode request)." A value 1 indicates a "Lo mode request." A value 2 indicates a "Hi mode request." A value 3 indicates an "intermittent operation mode request (Intermittent mode request)." A value 4 indicates an "Auto mode request." A value 5 indicates a "Mist mode request." Though values 6 and 7 are not used in the present embodiment, they can also be set and used as appropriate.

When vehicle control interface 110 receives the front windshield wiper operation mode request from ADK 200, it generates a control command corresponding to a value indicated in the front windshield wiper operation mode request and provides the control command to VP 120. When the front windshield wiper operation mode request indicates the value 0, vehicle control interface 110 generates a control command indicating the "OFF mode request" and provides the control command to VP 120. When the front windshield wiper operation mode request indicates the value 1, vehicle control interface 110 generates a control command indicating the "Lo mode request" and provides the control command to VP 120. When the front windshield wiper operation mode request indicates the value 2, vehicle control interface 110 generates a control command indicating the "Hi mode request" and provides the control command to VP 120. When the front windshield wiper operation mode request indicates the value 3, vehicle control interface 110 generates a control command indicating the "Intermittent mode request" and provides the control command to VP 120. When the front windshield wiper operation mode request indicates the value 4, vehicle control interface 110 generates a control command indicating the "Auto mode request" and provides the control command to VP 120. When the front windshield wiper operation mode request indicates the value 5, vehicle control interface 110 generates a control command indicating the "Mist mode request" and provides the control command to VP 120.

When the third driver setting mode indicates the "OFF mode" or the "Auto mode," VP 120 accepts a control command. When the third driver setting mode does not indicate the "OFF mode" or the "Auto mode," that is, when the third driver setting mode indicates the "Lo mode," the "Hi mode," the "intermittent operation mode," or the "Mist mode," VP 120 does not accept the control command. While the third driver setting mode indicates the "OFF mode" or the "Auto mode," VP 120 sets the operation mode of the front windshield wiper to the "OFF mode" when it receives the control command indicating the "OFF mode request," VP 120 sets the operation mode of the front windshield wiper to the "Lo mode" when it receives the control command indicating the "Lo mode request," VP 120 sets the operation mode of the front windshield wiper to the "Hi mode" when it receives the control command indicating the "Hi mode request," VP 120 sets the operation mode of the front windshield wiper to the "intermittent operation mode" when it receives the control command indicating the "Intermittent mode request," VP 120 sets the operation mode of the front windshield wiper to the "Auto mode" when it receives the control command indicating the "Auto mode request," and VP 120 sets the operation mode of the front windshield wiper to the "Mist mode" when it receives a control command indicating the "Mist mode request."

When the user has changed the third driver setting mode by performing an operation onto the operation apparatus, VP 120 sets the operation mode of the front windshield wiper not in accordance with the control command but in accordance with the changed third driver setting mode. In other words, VP 120 prioritizes the operation by the user (a third driver input) over the command from ADK 200.

Figure 8:
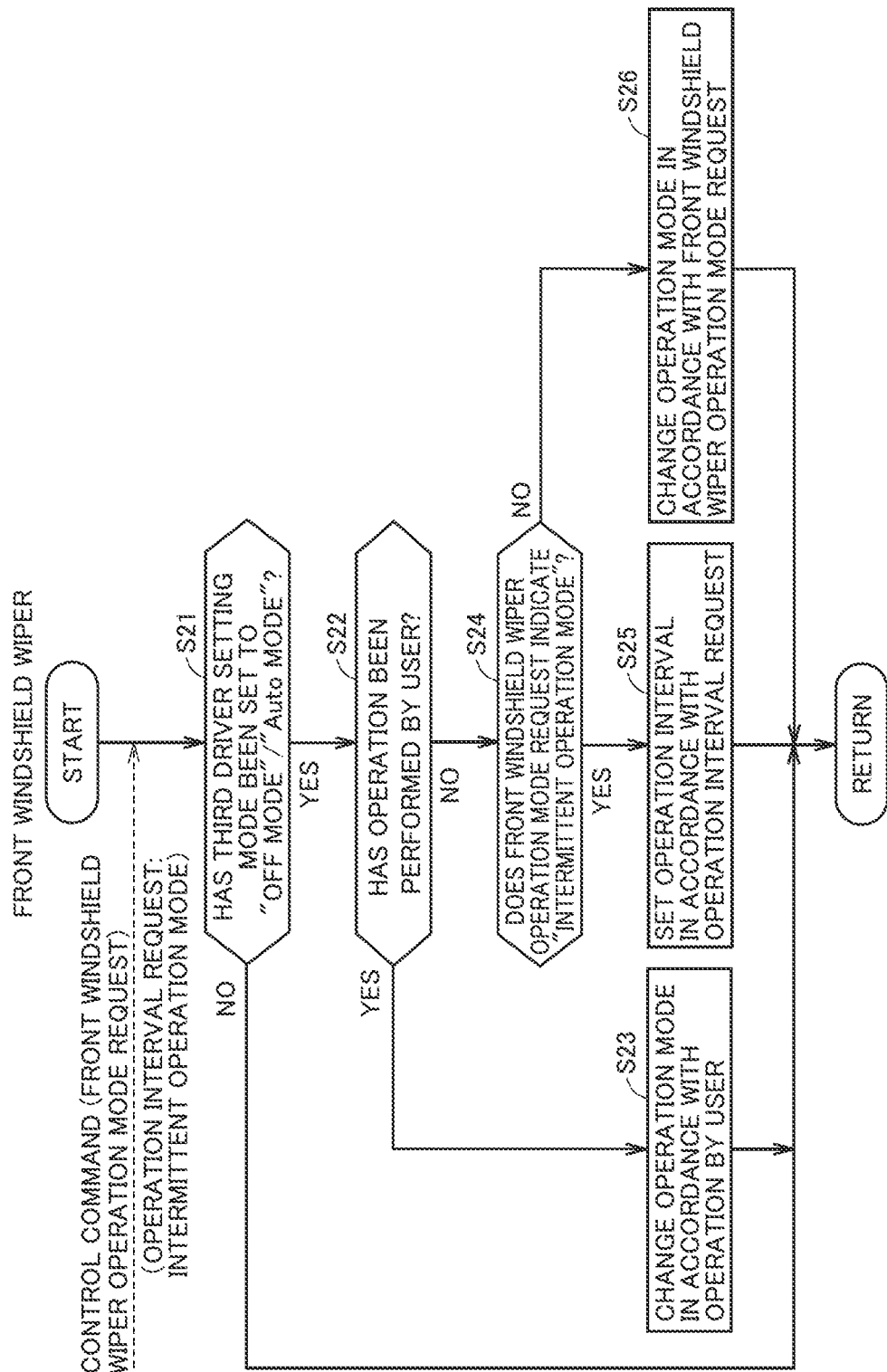
FIG. 8 is a flowchart showing a procedure of processing for setting an operation mode of a front windshield wiper.

FIG. 8 is a flowchart showing a procedure of processing for setting an operation mode of the front windshield wiper. Processing in the flowchart in FIG. 8 is repeatedly performed in VP 120 every prescribed control cycle.

VP 120 determines whether or not the third driver setting mode indicates the "OFF mode" or the "Auto mode" (S21). When the third driver setting mode indicates the "Lo mode," the "Hi mode," the "intermittent operation mode," or the "Mist mode" (NO in S21), VP 120 maintains the third driver setting mode as the operation mode of the front windshield wiper and the process returns. In other words, VP 120 does not accept a command from ADK 200.

When the third driver setting mode indicates the "OFF mode" or the "Auto mode" (YES in S21), VP 120 determines whether or not the user has performed an operation onto the operation apparatus (S22). In other words, VP 120 determines whether or not the third driver setting mode has been changed.

When the user has performed an operation onto the operation apparatus (YES in S22), VP 120 changes the operation mode of the front windshield wiper to the third driver setting mode indicated by the operation by the user (S23).

When the user has not performed an operation onto the operation apparatus (NO in S22), VP 120 determines whether or not the front windshield wiper operation mode request from ADK 200 indicates the "Intermittent mode request" (S24). VP 120 determines contents of the front windshield wiper operation mode request based on a control command from vehicle control interface 110.

When the front windshield wiper operation mode request indicates a request other than the "Intermittent mode request" (NO in S24), VP 120 changes the operation mode of the front windshield wiper to the operation mode indicated in the front windshield wiper operation mode request (S26).

When the front windshield wiper operation mode request indicates the "Intermittent mode request" (YES in S24), VP 120 sets the operation mode to the intermittent operation mode (S25). An operation interval of the front windshield wiper in the intermittent operation mode is set in accordance with the command from ADK 200. The operation interval of the front windshield wiper in the intermittent operation mode will be described below.

In the present embodiment, "FAST", "SECOND FAST," "THIRD FAST," and "SLOW" can be set as the operation interval of the front windshield wiper in the intermittent operation mode. The operation interval of the front windshield wiper increases in the order of "FAST", "SECOND FAST," "THIRD FAST," and "SLOW".

When ADK 200 provides the "Intermittent mode request" as the front windshield wiper operation mode request, it provides, in addition to the "Intermittent mode request," an operation interval request (Windshieldwiper_Intermittent_Wiping_Speed_Command) indicating the operation interval in the intermittent operation mode of the front windshield wiper to vehicle control interface 110. Vehicle control interface 110 that has received the "Intermittent mode request" and the "operation interval request" generates a control command corresponding to the intermittent operation mode request and the operation interval request and provides the generated control command to VP 120. When VP 120 sets the operation mode of the front windshield wiper to the intermittent operation mode, it sets the operation interval of the front windshield wiper in the intermittent operation mode in accordance with the control command. That is, Windshieldwiper_Intermittent_Wiping_Speed_Command is a command to control the windshield wiper actuation interval at the intermittent mode.

The user can also set the operation interval of the front windshield wiper in the intermittent operation mode by performing an operation onto the operation apparatus. When the user sets the operation interval of the front windshield wiper in the intermittent operation mode by performing an operation onto the operation apparatus, VP 120 applies the operation interval set through the operation apparatus.

FIG. 9 is a diagram for illustrating a front windshield wiper operation interval request in the intermittent operation mode. FIG. 9 shows relation between an operation interval request and a corresponding value. Specifically, a value is shown in a field "value" and an operation interval request is shown in a field "Description". A field "remarks" is used when there are remarks.

Referring to FIG. 9, a value 0 indicates "FAST". A value 1 indicates "SECOND FAST." A value 2 indicates "THIRD FAST." A value 3 indicates "SLOW".

When vehicle control interface 110 receives the operation interval request from ADK 200, it generates a control command corresponding to a value indicated in the operation interval request and provides the control command to VP 120. Specifically, when the operation interval request indicates the value 0, vehicle control interface 110 generates the control command indicating "FAST" and provides the control command to VP 120. When the operation interval request indicates the value 1, vehicle control interface 110 generates the control command indicating "SECOND FAST" and provides the control command to VP 120. When the operation interval request indicates the value 2, vehicle control interface 110 generates the control command indicating "THIRD FAST" and provides the control command to VP 120. When the operation interval request indicates the value 3, vehicle control interface 110 generates the control command indicating "SLOW" and provides the control command to VP 120.

While the operation mode of the front windshield wiper is set to the intermittent operation mode, VP 120 sets the operation interval of the front windshield wiper to "FAST" when it receives the control command indicating "FAST", VP 120 sets the operation interval of the front windshield wiper to "SECOND FAST" when it receives the control command indicating "SECOND FAST," VP 120 sets the operation interval of the front windshield wiper to "THIRD FAST" when it receives the control command indicating "THIRD FAST," and VP 120 sets the operation interval of the front windshield wiper to "SLOW" when it receives the control command indicating "SLOW".

When the user has changed the operation interval of the front windshield wiper by performing an operation onto the operation apparatus, VP 120 changes the operation interval of the front windshield wiper not in accordance with the control command but in accordance with the operation by the user. In other words, VP 120 prioritizes the operation by the user over the command from ADK 200.

As set forth above, while the third driver setting mode indicates the "OFF mode" or the "Auto mode," VP 120 sets the operation mode of the front windshield wiper in accordance with the front windshield wiper operation mode request from ADK 200. By accepting the front windshield wiper operation mode request from ADK 200 only when the user is estimated to have left setting of the operation mode of the front windshield wiper system to ADK 200 or vehicle main body 100, uncomfortable feeling given to the user during autonomous driving can be suppressed. When the user has performed an operation, VP 120 prioritizes the operation by the user over the front windshield wiper operation mode request from ADK 200. By prioritizing the operation by the user over determination by ADK 200 during autonomous driving, uncomfortable feeling given to the user during autonomous driving can be suppressed.

VP 120 sets the operation interval of the front windshield wiper in the intermittent operation mode in accordance with the operation interval request from ADK 200. When the user has performed an operation, VP 120 prioritizes the operation by the user over the operation interval request from ADK 200. By prioritizing the operation by the user over determination by ADK 200 during autonomous driving, uncomfortable feeling given to the user during autonomous driving can be suppressed.

<Rear Windshield Wiper>

The rear windshield wiper includes an "OFF mode," a "Lo mode," and an "intermittent operation mode" as operation modes. The "OFF mode" refers to a mode in which the rear windshield wiper is stopped. The "Lo mode" refers to a mode in which the rear windshield wiper is operated at a prescribed speed. The "intermittent operation mode" refers to a mode in which the rear windshield wiper is intermittently operated. The operation interval of the rear windshield wiper in the intermittent operation mode in the present embodiment is fixed to a prescribed interval. The operation interval of the rear windshield wiper may be set similarly to the front windshield wiper described above.

The user can set the operation mode of the rear windshield wiper by performing an operation onto the operation apparatus (for example, a windshield wiper switch). The operation apparatus provides to VP 120 (body system 126) every prescribed control cycle, a signal (which is also referred to as a "fourth driver input" below) indicating an operation mode (which is also referred to as a "fourth driver setting mode" below) of the rear windshield wiper set by the operation by the user. VP 120 recognizes the fourth driver setting mode based on the fourth driver input.

VP 120 accepts a command from ADK 200. Specifically, ADK 200 provides a rear windshield wiper operation mode request (Windshieldwiper_Mode_Rear_Command) that indicates an operation state of the rear windshield wiper to vehicle control interface 110 every prescribed control cycle. Vehicle control interface 110 that has received the rear windshield wiper operation mode request generates a control command corresponding to the rear windshield wiper operation mode request and provides the generated control command to VP 120 (body system 126). VP 120 sets the operation mode of the rear windshield wiper in accordance with the control command. That is, Windshieldwiper_Mode_Rear_Command is a command to control the rear windshield wiper mode of the vehicle platform (VP 120). A value corresponding to the operation mode requested by ADK 200 is set in the rear windshield wiper operation mode request provided from ADK 200 in accordance with contents in FIG. 10 which will be described below.

FIG. 10 is a diagram for illustrating a rear windshield wiper operation mode request. FIG. 10 shows relation between a rear windshield wiper operation mode request and a corresponding value. Specifically, a value is shown in a field "value" and a rear windshield wiper operation mode request is shown in a field "Description". Remarks are given in a field "remarks".

Referring to FIG. 10, a value 0 indicates a "stop request (OFF mode request)." A value 1 indicates a "Lo mode request." A value 3 indicates an "intermittent operation mode request (Intermittent mode request)." Though values 2 and 4 to 7 are not used in the present embodiment, they can also be set and used as appropriate.

When vehicle control interface 110 receives the rear windshield wiper operation mode request from ADK 200, it generates a control command corresponding to a value indicated in the rear windshield wiper operation mode request and provides the control command to VP 120. When the rear windshield wiper operation mode request indicates the value 0, vehicle control interface 110 generates a control command indicating the "OFF mode request" and provides the control command to VP 120. When the rear windshield wiper operation mode request indicates the value 1, vehicle control interface 110 generates a control command indicating the "Lo mode request" and provides the control command to VP 120. When the rear windshield wiper operation mode request indicates the value 3, vehicle control interface 110 generates a control command indicating the "Intermittent mode request" and provides the control command to VP 120.

VP 120 sets the operation mode to the "OFF mode" when it receives the control command indicating the "OFF mode request," VP 120 sets the operation mode to the "Lo mode" when it receives the control command indicating the "Lo mode request," and VP 120 sets the operation mode to the "intermittent operation mode" when it receives a control command indicating the "Intermittent mode request."

When the user has changed the fourth driver setting mode by performing an operation onto the operation apparatus, VP 120 sets the operation mode of the rear windshield wiper not in accordance with the control command but in accordance with the changed fourth driver setting mode. In other words, VP 120 prioritizes the operation by the user (the fourth driver input) over the command from ADK 200.

Figure 11:
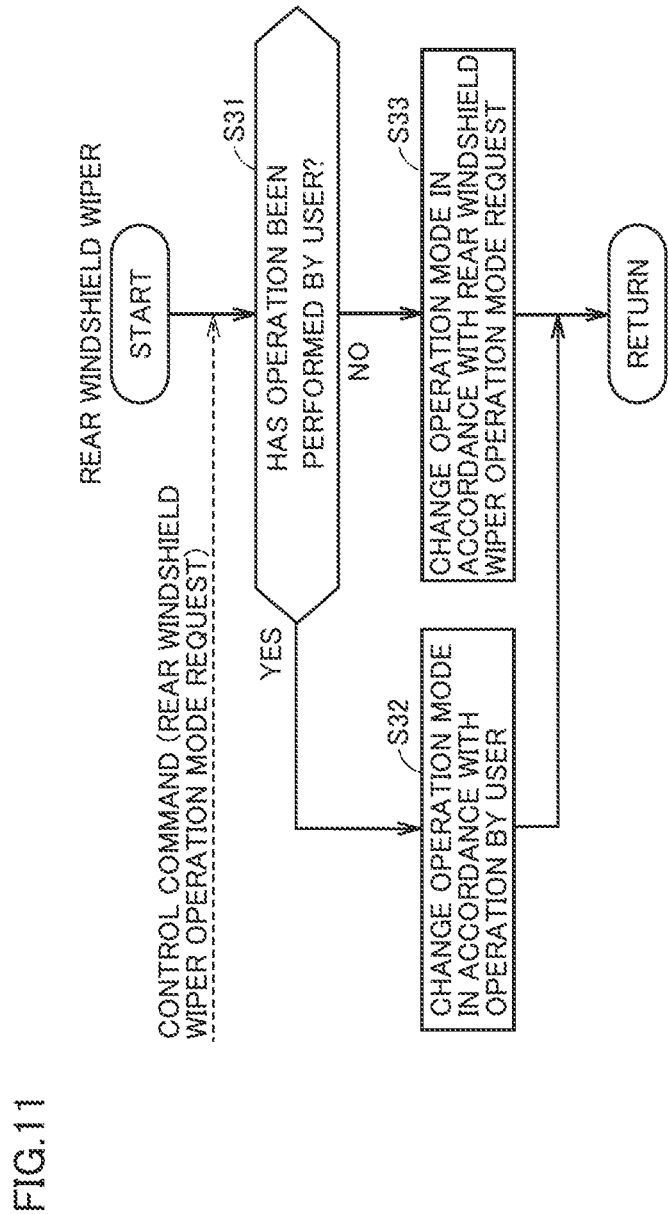
FIG. 11 is a flowchart showing a procedure of processing for setting an operation mode of a rear windshield wiper.

FIG. 11 is a flowchart showing a procedure of processing for setting an operation mode of the rear windshield wiper. Processing in the flowchart in FIG. 11 is repeatedly performed in VP 120 every prescribed control cycle.

VP 120 determines whether or not the user has performed an operation onto the operation apparatus (S31). In other words, VP 120 determines whether or not the fourth driver setting mode has been changed.

When the user has performed an operation onto the operation apparatus (YES in S31), VP 120 changes the operation mode of the rear windshield wiper to the fourth driver setting mode indicated by the operation by the user (S32).

When the user has not performed an operation onto the operation apparatus (NO in S31), VP 120 changes the operation mode of the rear windshield wiper to the operation mode indicated in the rear windshield wiper operation mode request from ADK 200 (S33).

As set forth above, VP 120 changes the operation mode of the rear windshield wiper in accordance with the rear windshield wiper operation mode request from ADK 200. When the user has performed an operation, however, VP 120 prioritizes the operation by the user over the rear windshield wiper operation mode request from ADK 200. By prioritizing the operation by the user over determination by ADK 200 during autonomous driving, uncomfortable feeling given to the user during autonomous driving can be suppressed.

[Aspects]

The exemplary embodiment described above will be understood by a person skilled in the art as a specific example of aspects below.

(Clause 1) A vehicle according to one aspect is a vehicle on which an autonomous driving system is mountable. The vehicle includes a vehicle platform that controls the vehicle in accordance with an instruction from the autonomous driving system and a vehicle control interface that interfaces between the vehicle platform and the autonomous driving system. The vehicle platform includes a headlight system, a hazard light system, a front windshield wiper system, and a rear windshield wiper system. The vehicle platform sets an operation mode of each of the headlight system, the hazard light system, the front windshield wiper system, and the rear windshield wiper system in accordance with (i) an operation mode request for each of the headlight system, the hazard light system, the front windshield wiper system, and the rear windshield wiper system received from the autonomous driving system and/or (ii) an operation by a user onto an operation apparatus provided for each of the headlight system, the hazard light system, the front windshield wiper system, and the rear windshield wiper system. The vehicle platform sets the operation mode with the operation by the user being prioritized over the operation mode request.

(Clause 2) In the vehicle described in Clause 1, when the operation mode of the headlight system has been set to a first prescribed mode by the operation by the user, the vehicle platform sets the operation mode of the headlight system in accordance with the operation mode request.

(Clause 3) In the vehicle described in Clause 2, when the operation mode of the headlight system has been set to a mode other than the first prescribed mode by the operation by the user, the vehicle platform does not set the operation mode of the headlight system in accordance with the operation mode request.

(Clause 4) In the vehicle described in Clause 2 or 3, the first prescribed mode includes an "OFF mode" and an "AUTO mode." The "OFF mode" is a mode in which a headlight is turned off. The "AUTO mode" is a mode in which the operation mode of the headlight system is automatically set by the vehicle platform.

(Clause 5) In the vehicle described in Clause 1, when the operation mode of the front windshield wiper system has been set to a second prescribed mode by the operation by the user, the vehicle platform sets the operation mode of the front windshield wiper system in accordance with the operation mode request.

(Clause 6) In the vehicle described in Clause 5, when the operation mode of the front windshield wiper system has been set to a mode other than the second prescribed mode by the operation by the user, the vehicle platform does not set the operation mode of the front windshield wiper system in accordance with the operation mode request.

(Clause 7) In the vehicle described in Clause 5 or 6, the second prescribed mode includes an "OFF mode" and an "Auto mode." The "OFF mode" is a mode in which a front windshield wiper is stopped. The "Auto mode" is a mode in which the operation mode of the front windshield wiper system is automatically set by the vehicle platform.

(Clause 8) In the vehicle described in any one of Clauses 5 to 7, the front windshield wiper system includes as the operation mode, an intermittent operation mode in which a front windshield wiper is intermittently operated. When the operation mode of the front windshield wiper system has been set to the intermittent operation mode, the vehicle platform sets an operation interval in accordance with an operation interval request that indicates the operation interval of the front windshield wiper in the intermittent operation mode received from the autonomous driving system and/or the operation by the user onto the operation apparatus.

(Clause 9) A vehicle according to one aspect includes an autonomous driving system that creates a driving plan, a vehicle platform that carries out vehicle control in accordance with an instruction from the autonomous driving system, and a vehicle control interface that interfaces between the vehicle platform and the autonomous driving system. The vehicle platform includes a headlight system, a hazard light system, a front windshield wiper system, and a rear windshield wiper system. The vehicle platform sets an operation mode of each of the headlight system, the hazard light system, the front windshield wiper system, and the rear windshield wiper system in accordance with (i) an operation mode request for each of the headlight system, the hazard light system, the front windshield wiper system, and the rear windshield wiper system received from the autonomous driving system and/or (ii) an operation by a user onto an operation apparatus provided for each of the headlight system, the hazard light system, the front windshield wiper system, and the rear windshield wiper system. The vehicle platform sets the operation mode with the operation by the user being prioritized over the operation mode request.

(Clause 10) In the vehicle described in Clause 9, when the operation mode of the headlight system has been set to a first prescribed mode by the operation by the user, the vehicle platform sets the operation mode of the headlight system in accordance with the operation mode request.

(Clause 11) In the vehicle described in Clause 10, when the operation mode of the headlight system has been set to a mode other than the first prescribed mode by the operation by the user, the vehicle platform does not set the operation mode of the headlight system in accordance with the operation mode request.

(Clause 12) In the vehicle described in Clause 10 or 11, the first prescribed mode includes an "OFF mode" and an "AUTO mode." The "OFF mode" is a mode in which a headlight is turned off. The "AUTO mode" is a mode in which the operation mode of the headlight system is automatically set by the vehicle platform.

(Clause 13) In the vehicle described in Clause 9, when the operation mode of the front windshield wiper system has been set to a second prescribed mode by the operation by the user, the vehicle platform sets the operation mode of the front windshield wiper system in accordance with the operation mode request.

(Clause 14) In the vehicle described in Clause 13, when the operation mode of the front windshield wiper system has been set to a mode other than the second prescribed mode by the operation by the user, the vehicle platform does not set the operation mode of the front windshield wiper system in accordance with the operation mode request.

(Clause 15) In the vehicle described in any one of Clauses 13 to 15, the front windshield wiper system includes as the operation mode, an intermittent operation mode in which a front windshield wiper is intermittently operated. When the operation mode of the front windshield wiper system has been set to the intermittent operation mode, the vehicle platform sets an operation interval in accordance with (i) an operation interval request that indicates the operation interval of the front windshield wiper in the intermittent operation mode received from the autonomous driving system and/or (ii) the operation by the user onto the operation apparatus and sets the operation interval with the operation by the user being prioritized over the operation interval request.

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| May 4, 2019 | 0.1 | Creating a new material | MaaS Business Div. |

Index
1. Outline 4
1.1. Purpose of this Specification 4
1.2. Target Vehicle 4
1.3. Definition of Term 4
1.4. Precaution for Handling 4
2. Structure 5
2.1. Overall Structure of MaaS 5
2.2. System structure of MaaS vehicle 6
3. Application Interfaces 7
3.1. Responsibility sharing of when using APIs 7
3.2. Typical usage of APIs 7
3.3. APIs for vehicle motion control 9
 3.3.1. Functions 9
 3.3.2. Inputs 16
 3.3.3. Outputs 23
3.4. APIs for BODY control 45
 3.4.1. Functions 45
 3.4.2. Inputs 45
 3.4.3. Outputs 56
3.5. APIs for Power control 68
 3.5.1. Functions 68
 3.5.2. Inputs 68
 3.5.3. Outputs 69
3.6. APIs for Safety 70
 3.6.1. Functions 70
 3.6.2. Inputs 70
 3.6.3. Outputs 70
3.7. APIs for Security 74
 3.7.1. Functions 74
 3.7.2. Inputs 74
 3.7.3. Outputs 76
3.8. APIs for MaaS Service 80
 3.8.1. Functions 80
 3.8.2. Inputs 80
 3.8.3. Outputs 80
1. Outline
1.1. Purpose of this Specification
This document is an API specification of Toyota Vehicle Platform and contains the outline, the usage and the caveats of the application interface.
1.2. Target Vehicle
e-Palette, MaaS vehicle based on the POV (Privately Owned Vehicle) manufactured by Toyota

1.3. Definition of Term

TABLE 2

| Term | Definition |
| --- | --- |
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.

All the contents are subject to change. Such changes are notified to the users. Please note that some parts are still T.B.D. will be updated in the future.

2. Structure 2.1. Overall Structure of MaaS

Figure 12:
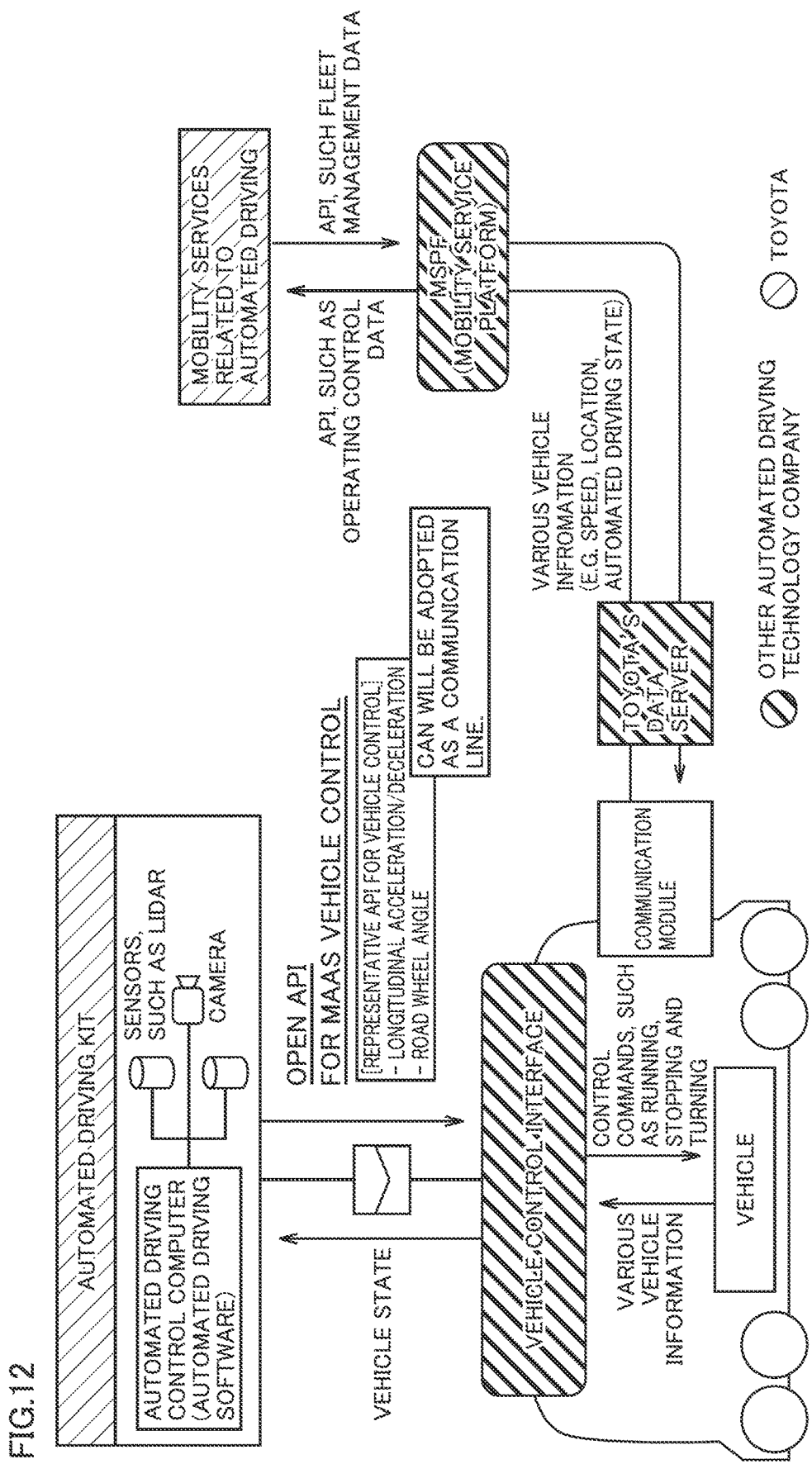
FIG. 12 is a diagram of an overall configuration of MaaS.

The overall structure of MaaS with the target vehicle is shown (FIG. 12).

Vehicle control technology is being used as an interface for technology providers.

Technology providers can receive open API such as vehicle state and vehicle control, necessary for development of automated driving systems.

2.2. System structure of MaaS vehicle

Figure 13:
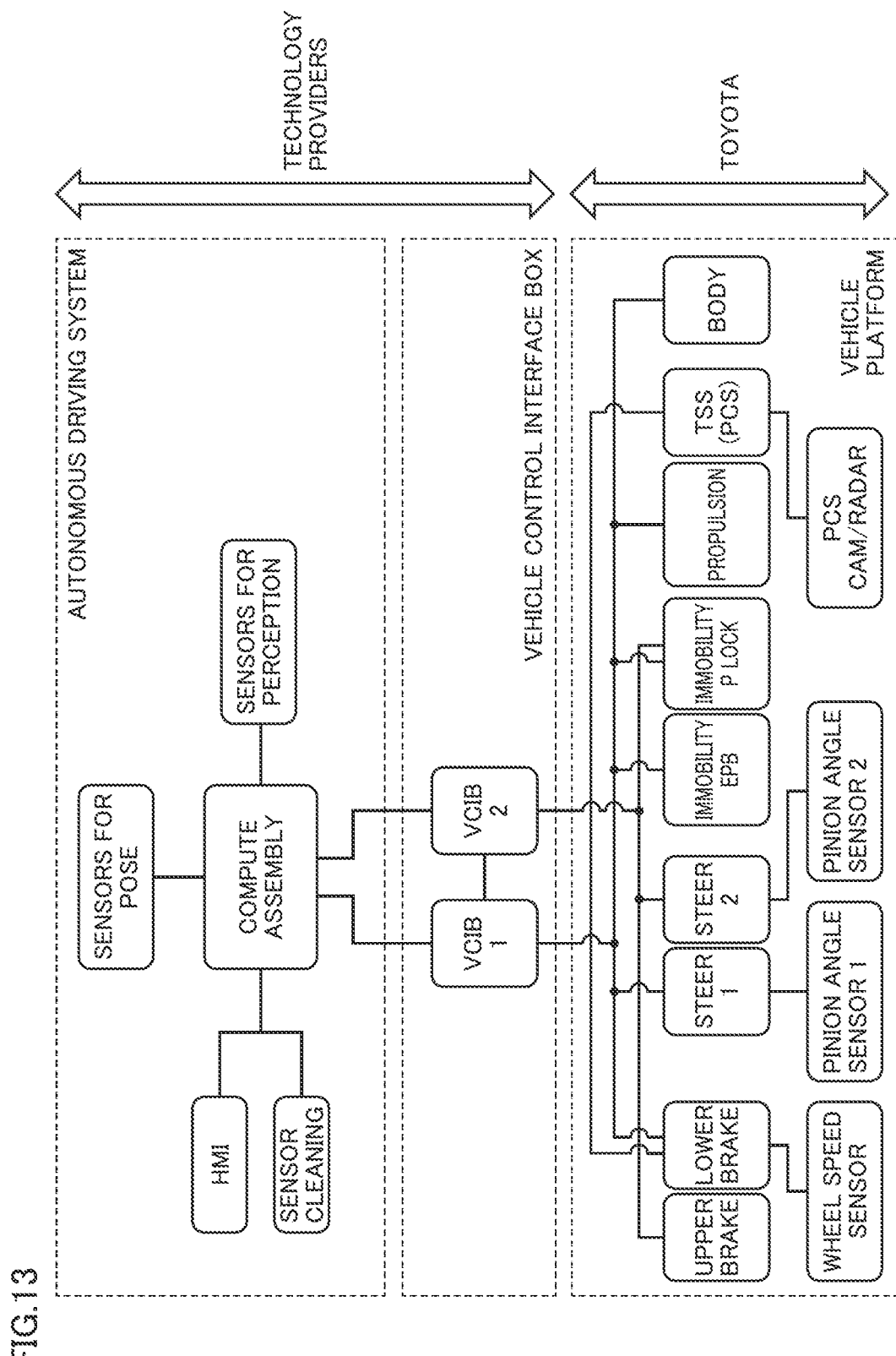
FIG. 13 is a diagram of a system configuration of a MaaS vehicle.

The system architecture as a premise is shown (FIG. 13).

The target vehicle will adopt the physical architecture of using CAN for the bus between ADS and VCIB. In order to realize each API in this document, the CAN frames and the bit assignments are shown in the form of "bit assignment table" as a separate document.

3. Application Interfaces 3.1. Responsibility Sharing of when Using APIs Basic responsibility sharing between ADS and vehicle VP is as follows when using APIs.

[ADS]

The ADS should create the driving plan, and should indicate vehicle control values to the VP.

[VP]

The Toyota VP should control each system of the VP based on indications from an ADS.

3.2. Typical Usage of APIs

In this section, typical usage of APIs is described.

CAN will be adopted as a communication line between ADS and VP. Therefore, basically, APIs should be executed every defined cycle time of each API by ADS.

A typical workflow of ADS of when executing APIs is as follows (FIG. 14).

3.3. APIs for Vehicle Motion Control

In this section, the APIs for vehicle motion control which is controllable in the MaaS vehicle is described.

3.3.1. Functions 3.3.1.1. Standstill, Start Sequence

The transition to the standstill (immobility) mode and the vehicle start sequence are described. This function presupposes the vehicle is in Autonomy_State=Autonomous Mode. The request is rejected in other modes.

The Below Diagram Shows an Example.

Acceleration Command requests deceleration and stops the vehicle. Then, when Longitudinal_Velocity is confirmed as 0 [km/h], Standstill Command="Applied" is sent. After the brake hold control is finished, Standstill Status becomes "Applied". Until then, Acceleration Command has to continue deceleration request. Either Standstill Command="Applied" or Acceleration Command's deceleration request were canceled, the transition to the brake hold control will not happen. After that, the vehicle continues to be standstill as far as Standstill Command="Applied" is being sent. Acceleration Command can be set to 0 (zero) during this period.

If the vehicle needs to start, the brake hold control is cancelled by setting Standstill Command to "Released". At the same time, acceleration/deceleration is controlled based on Acceleration Command (FIG. 15).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows an example. Acceleration Command requests deceleration and makes the vehicle stop. After Actual_Moving_Direction is set to "standstill", any shift position can be requested by Propulsion Direction Command. (In the example below, "D"→"R").

During shift change, Acceleration Command has to request deceleration.

After the shift change, acceleration/deceleration is controlled based on Acceleration Command value (FIG. 16).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by Immobilization Command="Applied". Acceleration Command is set to Deceleration until Immobilization Status is set to "Applied".

If release is desired, Immobilization Command="Release" is requested when the vehicle is stationary. Acceleration Command is set to Deceleration at that time.

After this, the vehicle is accelerated/decelerated based on Acceleration Command value (FIG. 17).

3.3.1.4. Road_Wheel_Angle Request

This function presupposes Autonomy_State="Autonomous Mode", and the request is rejected otherwise.

Tire Turning Angle Command is the relative value from Estimated_Road_Wheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1 [rad].

If ADS requests to steer by −0.3 [rad], Tire Turning Angle Command should be set to −0.3+0.1=−0.2 [rad].

3.3.1.5. Rider Operation 3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and
2) the torque value calculated from requested wheel angle.

Note that Tire Turning Angle Command is not accepted if the driver strongly turns the steering wheel. The above-mentioned is determined by Steering_Wheel_Intervention flag.

3.3.2. Inputs

TABLE 3

| Signal Name | Description | Redundancy |
| --- | --- | --- |
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
| --- | --- | --- |
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration ($-0.4$ m/s$^2$) simultaneously. (Only while brake is applied.)

The request may not be accepted in following cases.

Direction_Control_Degradation_Modes="Failure detected"

3.3.2.2. Immobilization Command

Request to Engage/Release WheelLock

Values

TABLE 5

| value | Description | Remarks |
| --- | --- | --- |
| 0 | No Request | |
| 1 | Applied | EPB is turned on and TM shifts to P range |

TABLE 5-continued

| value | Description | Remarks |
| --- | --- | --- |
| 2 | Released | EPB is turned off and TM shifts to the value of Propulsion Direction Command |

Remarks

Available only when Autonomy_State="Autonomous Mode"

Changeable only when the vehicle is stationary (Actual_Moving_Direction="standstill")

The request is rejected when vehicle is running.

When Apply/Release mode change is requested, Acceleration Command is set to deceleration ($-0.4$ m/s$^2$). (Only while brake is applied.)

3.3.2.3. Standstill Command

Request the Vehicle to be Stationary

Values

TABLE 6

| value | Description | Remarks |
| --- | --- | --- |
| 0 | No Request | |
| 1 | Applied | Standstill is requested |
| 2 | Released | |

Remarks

Only available when Autonomy_State="Autonomous Mode"

Confirmed by Standstill Status="Applied"

When the vehicle is stationary (Actual_Moving_Direction="standstill"), transition to Stand Still is enabled.

Acceleration Command has to be continued until Standstill Status becomes "Applied" and Acceleration Command's deceleration request ($-0.4$ m/s$^2$) should be continued.

There are more cases where the request is not accepted. Details are T.B.D.

3.3.2.4. Acceleration Command

Command Vehicle Acceleration

Values

Estimated_Max_Decel_Capability to Estimated_Max_Accel_Capability [m/s$^2$]

Remarks

Only available when Autonomy_State="Autonomous Mode"

Acceleration (+) and deceleration (—) request based on Propulsion Direction Status direction The upper/lower limit will vary based on Estimated_Max_Decel_Capability and Estimated_Max_Accel_Capability.

When acceleration more than Estimated_Max_Accel_Capability is requested, the request is set to Estimated_Max_Accel_Capability.
When deceleration more than Estimated_Max_Decel_Capability is requested, the request is set to Estimated_Max_Decel_Capability.
Depending on the accel/brake pedal stroke, the requested acceleration may not be met. See 3.4.1.4 for more detail.
When Pre-Collision system is activated simultaneously, minimum acceleration (maximum deceleration) is selected.

3.3.2.5. Tire Turning Angle Command

Command Tire Turning Angle
Values

TABLE 7

| value | Description | Remarks |
|---|---|---|
| — | [unit:rad] | |

Remarks
Left is positive value (+). Right is negative value (—).
Available only when Autonomy_State="Autonomous Mode"

The output of Estimated_Road_Wheel_Angle_Actual when the vehicle is going straight, is set to the reference value (0).
This requests relative value of Estimated_Road_Wheel_Angle_Actual. (See 3.4.1.1 for details)
The requested value is within Current_Road_Wheel_Angle_Rate_Limit.
The requested value may not be fulfilled depending on the steer angle by the driver.

3.3.2.6. Autonomization Command

Request to Transition Between Manual Mode and Autonomy Mode
Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g. In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |

TABLE 9-continued

| Signal Name | Description | Redundancy |
|---|---|---|
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status
Current Shift Range
Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".

When the vehicle becomes the following status during VO mode, [Propulsion Direction Status] will turn to "P".
  [Longitudinal_Velocity]=0 [km/h]
  [Brake_Pedal_Position]<Threshold value (T.B.D.) (in case of being determined that the pedal isn't depressed)
  [1st_Left_Seat_Belt_Status]=Unbuckled
  [1st_Left_Door_Open_Status]=Opened 3.3.3.2. Propulsion Direction by Driver
Shift Lever Position by Driver Operation
Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver

If the driver releases his hand of the shift lever, the lever returns to the central position and the output is set as "No Request".

When the vehicle becomes the following status during NVO mode, [Propulsion Direction by Driver] will turn to "1(P)".
  [Longitudinal_Velocity]=0 [km/h]
  [Brake_Pedal_Position]<Threshold value (T.B.D.) (in case of being determined that the pedal isn't depressed)
  [1st_Left_Seat_Belt_Status]=Unbuckled
  [1st_Left_Door_Open_Status]=Opened 3.3.3.3. Immobilization Status
Output EPB and Shift-P Status
Values
<Primary>

TABLE 12

| Value | | Description | Remarks |
|---|---|---|---|
| Shift | EPB | | |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | Description | Remarks |
|---|---|---|---|
| Shift | | | |
| 0 | 0 | Other than Shift P | |
| 1 | 0 | Shift P | |
| 0 | 1 | Reserved | |
| 1 | 1 | Reserved | |

Remarks
Secondary signal does not include EPB lock status.

3.3.3.4. Immobilization Request by Driver
Driver Operation of EPB Switch
Values

TABLE 14

| value | Description | remarks |
|---|---|---|
| 0 | No Request | |
| 1 | Engaged | |
| 2 | Released | |
| 3 | Invalid value | |

Remarks
"Engaged" is outputted while the EPB switch is being pressed.
"Released" is outputted while the EPB switch is being pulled.

3.3.3.5. Standstill Status
Vehicle Stationary Status
Values

TABLE 15

| Value | Description | remarks |
|---|---|---|
| 0 | Released | |
| 1 | Applied | |
| 2 | Reserved | |
| 3 | Invalid value | |

Remarks

When Standstill Status=Applied continues for 3 minutes, EPB is activated.

If the vehicle is desired to start, ADS requests Standstill Command="Released".

3.3.3.6. Estimated_Coasting_Rate

Estimated Vehicle Deceleration when Throttle is Closed

Values

[unit: m/s$^2$]

Remarks

Estimated acceleration at WOT is calculated.

Slope and road load etc. are taken into estimation.

When the Propulsion Direction Status is "D", the acceleration to the forward direction shows a positive value.

When the Propulsion Direction Status is "R", the acceleration to the reverse direction shows a positive value.

3.3.3.7. Estimated_Max_Accel_Capability

Estimated Maximum Acceleration

Values

[unit: m/s$^2$]

Remarks

The acceleration at WOT is calculated.

Slope and road load etc. are taken into estimation.

The direction decided by the shift position is considered to be plus.

3.3.3.8. Estimated_Max_Decel_Capability

Estimated Maximum Deceleration

Values

−9.8 to 0 [unit: m/s$^2$]

Remarks

Affected by Brake_System_Degradation_Modes. Details are T.B.D.

Based on vehicle state or road condition, cannot output in some cases 3.3.3.9. Estimated_Road_Wheel_Angle_Actual Front Wheel Steer Angle Values

TABLE 16

| value | Description | Remarks |
|---|---|---|
| others | [unit: rad] | |
| Minimum Value | Invalid value | The sensor is invalid. |

Remarks

Left is positive value (+). Right is negative value (—).

Before "the wheel angle when the vehicle is going straight" becomes available, this signal is Invalid value.

3.3.3.10. Estimated_Road_Wheel_Angle_Rate_Actual

Front Wheel Steer Angle Rate

Values

TABLE 17

| value | Description | Remarks |
|---|---|---|
| others | [unit: rad/s] | |
| Minimum Value | Invalid value | |

Remarks

Left is positive value (+). Right is negative value (—).

3.3.3.11. Steering_Wheel_Angle_Actual

Steering Wheel Angle

Values

TABLE 18

| Value | Description | Remarks |
|---|---|---|
| others | [unit: rad] | |
| Minimum Value | Invalid value | |

Remarks

Left is positive value (+). Right is negative value (—).

The steering angle converted from the steering assist motor angle

Before "the wheel angle when the vehicle is going straight" becomes available, this signal is Invalid value.

3.3.3.12. Steering_Wheel_Angle_Rate_Actual

Steering Wheel Angle Rate

Values

TABLE 19

| Value | Description | Remarks |
|---|---|---|
| others | [unit: rad/s] | |
| Minimum Value | Invalid value | |

Remarks

Left is positive value (+). Right is negative value (—).

The steering angle rate converted from the steering assist motor angle rate 3.3.3.13. Current_Road_Wheel_Angle_Rate_Limit Road Wheel Angle Rate Limit Values When stopped: 0.4 [rad/s]

While running: Show "Remarks"

Remarks

Calculated from the "vehicle speed—steering angle rate" chart like below

A) At a very low speed or stopped situation, use fixed value of 0.4 [rad/s]

Figure 18:
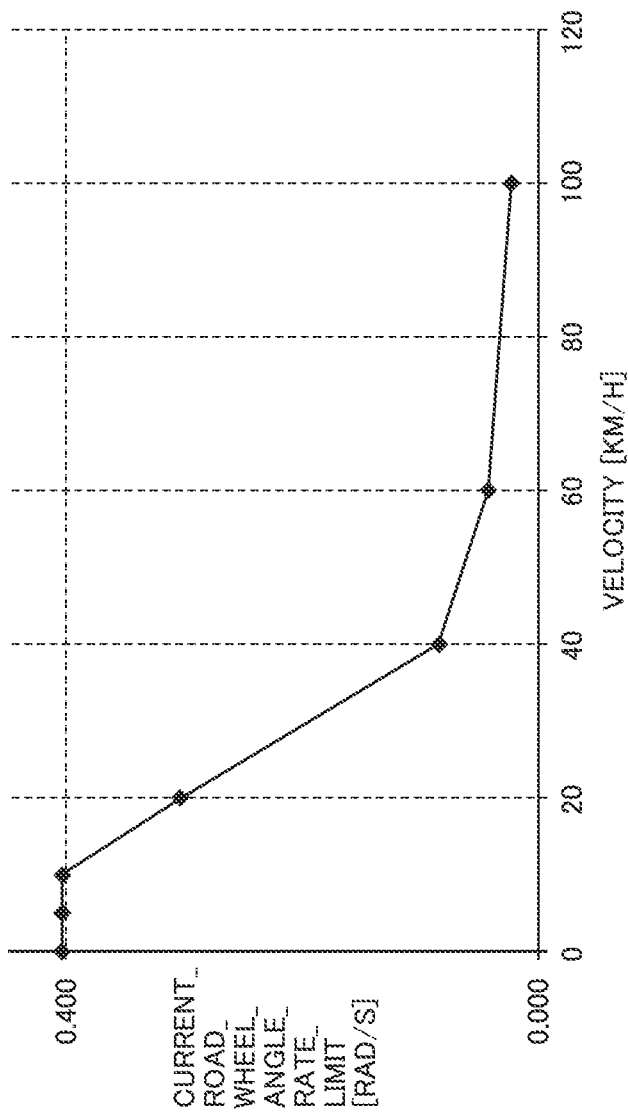
FIG. 18 is a diagram showing a limit value of variation in tire turning angle.

B) At a higher speed, the steering angle rate is calculated from the vehicle speed using 2.94 m/s$^3$ The threshold speed between A and B is 10 [km/h] (FIG. 18).

3.3.3.14. Estimated_Max_Lateral_Acceleration_Capability

Estimated Max Lateral Acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated Max Lateral Acceleration Rate

Values 2.94 [unit: m/s$^3$] fixed value

Remarks

Wheel Angle controller is designed within the acceleration range up to 2.94 m/s$^3$.

3.3.3.16. Accelerator_Pedal_Position

Position of the accelerator pedal (How much is the pedal depressed?)

Values 0 to 100 [unit: %]

Remarks

In order not to change the acceleration openness suddenly, this signal is filtered by smoothing process.

In normal condition
  The accelerator position signal after zero point calibration is transmitted.

In failure condition
  Transmitted failsafe value (0xFF)

3.3.3.17. Accelerator_Pedal_Intervention

This signal shows whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed".

When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal will not turn to "2".

Figure 19:
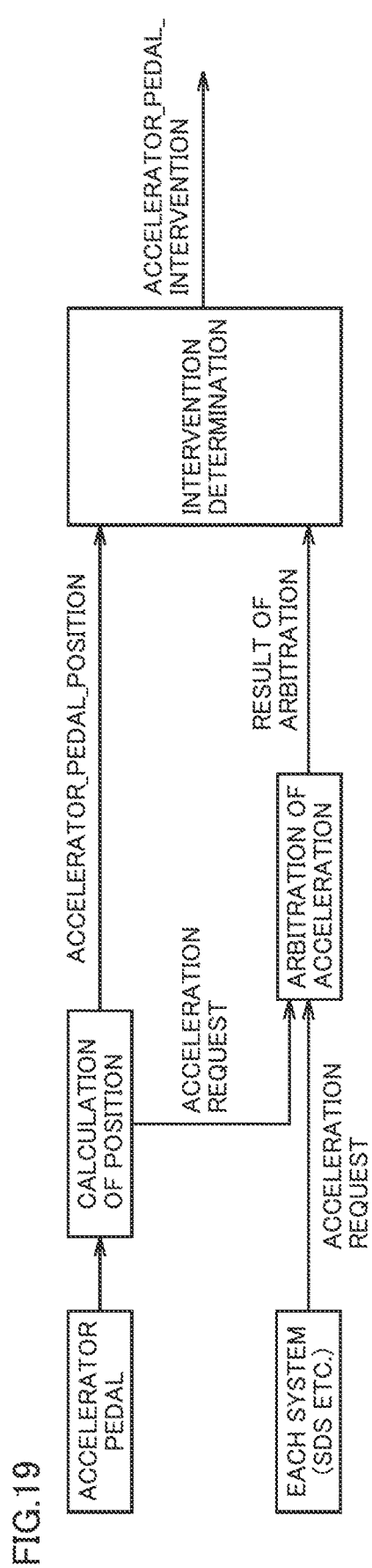
FIG. 19 is a diagram illustrating intervention by an accelerator pedal.

Detail design (FIG. 19)

3.3.3.18. Brake_Pedal_Position

Position of the brake pedal (How much is the pedal depressed?)

Values 0 to 100 [unit: %]

Remarks

In the brake pedal position sensor failure:
  Transmitted failsafe value (0xFF)

Due to assembling error, this value might be beyond 100%.

3.3.3.19. Brake_Pedal_Intervention

This Signal Shows Whether the Brake Pedal is Depressed by a Driver (Intervention).

Values

TABLE 21

| Value | Description | Remarks |
|---|---|---|
| 0 | Not depressed | |
| 1 | depressed | |
| 2 | Beyond autonomy deceleration | |

Remarks

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 20:
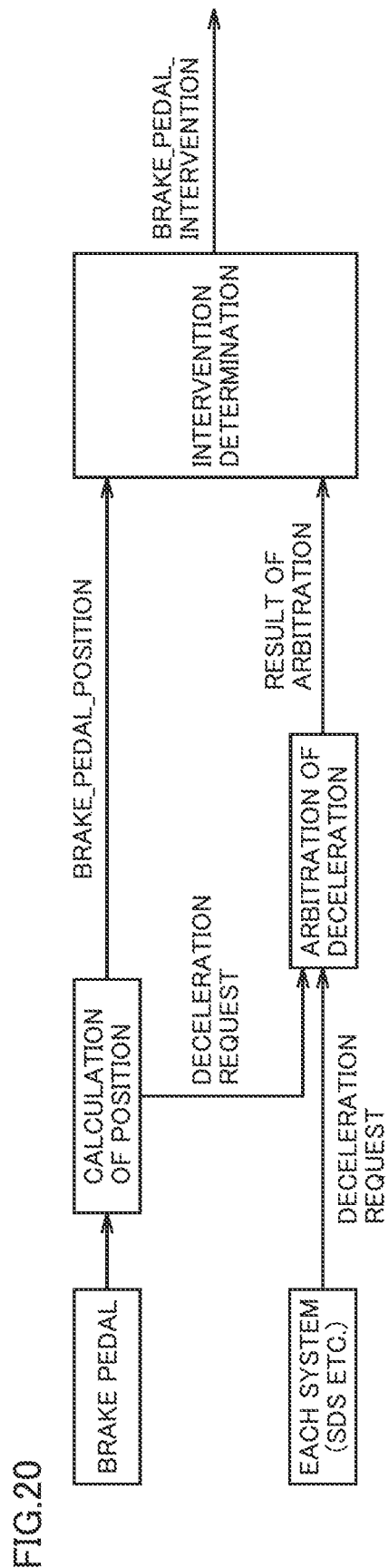
FIG. 20 is a diagram illustrating intervention by a brake pedal.

Detail design (FIG. 20)

3.3.3.20. Steering_Wheel_Intervention

This signal shows whether the steering wheel is turned by a driver (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21. Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A 3.3.3.22. WheelSpeed_FL, WheelSpeed_FR, WheelSpeed_RL, WheelSpeed_RR Wheel Speed Value Values

TABLE 24

| Value | Description | Remarks |
|---|---|---|
| others | Velocity [unit: m/s] | |
| Maximum Value | Invalid value | The sensor is invalid. |

Remarks

T.B.D.

3.3.3.23. WheelSpeed_FL_Rotation, WheelSpeed_FR_Rotation, WheelSpeed_RL_Rotation, WheelSpeed_RR_Rotation Rotation Direction of Each Wheel Values

TABLE 25

| value | Description | remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation Direction of Wheel

Values

TABLE 26

| value | Description | remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated Longitudinal Velocity of Vehicle

Values

TABLE 27

| Value | Description | Remarks |
|---|---|---|
| others | Velocity [unit: m/s] | |
| Maximum Value | Invalid value | The sensor is invalid. |

Remarks

This signal is output as the absolute value.

3.3.3.26. Longitudinal_Acceleration

Estimated Longitudinal Acceleration of Vehicle

Values

TABLE 28

| value | Description | Remarks |
|---|---|---|
| others | Acceleration [unit: m/s$^2$] | |
| Minimum Value | Invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral_Acceleration

Sensor value of lateral acceleration of vehicle

Values

TABLE 29

| Value | Description | Remarks |
|---|---|---|
| others | Acceleration [unit: m/s$^2$] | |
| Minimum Value | Invalid value | The sensor is invalid. |

Remarks

The positive value means counterclockwise. The negative value means clockwise.

3.3.3.28. Yawrate

Sensor Value of Yaw Rate

Values

TABLE 30

| Value | Description | Remarks |
|---|---|---|
| others | Yaw rate [unit: deg/s] | |
| Minimum Value | Invalid value | The sensor is invalid. |

Remarks

The positive value means counterclockwise. The negative value means clockwise.

3.3.3.29. Autonomy_State

State of Whether Autonomy Mode or Manual Mode

Values

TABLE 31

| value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

3.3.3.30. Autonomy_Ready

Situation of Whether the Vehicle can Transition to Autonomy Mode or not

Values

TABLE 32

| value | Description | Remarks |
|---|---|---|
| 00b | Not Ready For Autonomy | |
| 01b | Ready For Autonomy | |
| 11b | Invalid | means the status is not determined. |

Remarks

This signal is a part of transition conditions toward the Autonomy mode.

Please see the summary of conditions.

3.3.3.31. Autonomy_Fault

Status of whether the fault regarding a functionality in autonomy mode occurs or not Values

TABLE 33

| value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.

[T.B.D.] Need to consider the condition to release the status of "fault".

3.4. APIs for BODY control

3.4.1. Functions

T.B.D.

3.4.2. Inputs

TABLE 34

| Signal Name | Description | Redundancy |
| --- | --- | --- |
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to control the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperature_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform

TABLE 35

| value | Description | remarks |
| --- | --- | --- |
| 0 | OFF | Blinker OFF |
| 1 | Right | Right blinker ON |
| 2 | Left | Left blinker ON |
| 3 | reserved | |

Remarks

T.B.D.

Detailed Design

When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to Control the Headlight Mode of the Vehicle Platform

Values

TABLE 36

| Value | Description | remarks |
|---|---|---|
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.

Driver input overrides this command.

Headlight mode changes when Vehicle platform receives once this command.

3.4.2.3. Hazardlight_Mode_Command

Command to Control the Hazardlight Mode of the Vehicle Platform

TABLE 37

| value | Description | remarks |
|---|---|---|
| 0 | OFF | command for hazardlight OFF |
| 1 | ON | command for hazardlight ON |

Remarks

Driver input overrides this command.

Hazardlight is active during Vehicle Platform receives ON command.

3.4.2.4. Horn_Pattern_Command

Command to control the pattern of horn ON-time and OFF-time per cycle of the vehicle platform Values

TABLE 38

| value | Description | remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.

Detail is under internal discussion.

3.4.2.5. Horn_Number_of_Cycle_Command

Command to control the Number of horn ON/OFF cycle of the vehicle platform

Values

0~7 [-]

Remarks

Detail is under internal discussion.

3.4.2.6. Horn_Continuous_Command

Command to Control of Horn ON of the Vehicle Platform

Values

TABLE 39

| value | Description | remarks |
|---|---|---|
| 0 | No request | |
| 1 | ON request | |

Remarks

This command overrides Horn_Pattern_Command, Horn_Number_of_Cycle_Command.

Horn is active during Vehicle Platform receives ON command.

Detail is under internal discussion.

3.4.2.7. Windshieldwiper_Mode_Front_Command

Command to Control the Front Windshield Wiper of the Vehicle Platform

Values

TABLE 40

| value | Description | remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.

This command is valid when Windshieldwiper_Front_Driver_Input=OFF or Auto mode ON.

Driver input overrides this command.

Windshieldwiper mode is kept during Vehicle platform is receiving the command.

3.4.2.8. Windshieldwiper_Intermittent_Wiping_Speed_Command

Command to Control the Windshield Wiper Actuation Interval at the Intermittent Mode Values

TABLE 41

| value | Description | remarks |
|---|---|---|
| 0 | FAST | |
| 1 | SECOND FAST | |
| 2 | THIRD FAST | |
| 3 | SLOW | |

Remarks

This command is valid when Windshieldwiper_Mode_Front_Status=INT.

Driver input overrides this command.

Windshieldwiper intermittent mode changes when Vehicle platform receives once this command.

3.4.2.9. Windshieldwiper_Mode_Rear_Command

Command to Control the Rear Windshield Wiper Mode of the Vehicle Platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks

Driver input overrides this command.

Windshieldwiper mode is kept during Vehicle platform is receiving the command.

Wiping speed of intermittent mode is not variable.

3.4.2.10. Hvac_1st_Command

Command to start/stop 1st row air conditioning control

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks

The hvac of S-AM has a synchronization functionality. Therefore, in order to control 4 (four) hvacs (1st_left/right, 2nd_left/right) individually, VCIB achieves the following procedure after Ready-ON. (This functionality will be implemented from the CV.)

1: Hvac_1st_Command=ON
2: Hvac_2 nd_Command=ON
3: Hvac_TargetTemperature_2 nd_Left_Command
4: Hvac_TargetTemperature_2 nd_Right_Command
5: Hvac_Fan_Level_2 nd_Row_Command
6: Hvac_2 nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command The interval between each command needs 200 ms or more.

Other commands are able to be executed after #1.

3.4.2.11. Hvac_2nd_Command

Command to Start/Stop 2nd Row Air Conditioning Control

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks

N/A

3.4.2.12. Hvac_TargetTemperature_1st_Left_Command

Command to set the target temperature around front left area

Values

TABLE 45

| value | Description | Remarks |
|---|---|---|
| 0 | No request | |
| 60 to 85 [unit: ° F.] (by 1.0° F.) | Temperature direction | |

Remarks

N/A

3.4.2.13. Hvac_TargetTemperature_1st_Right_Command

Command to Set the Target Temperature Around Front Right Area

Values

TABLE 46

| value | Description | Remarks |
|---|---|---|
| 0 | No request | |
| 60 to 85 [unit: ° F.] (by 1.0° F.) | Temperature direction | |

Remarks

N/A

3.4.2.14. Hvac_TargetTemperature_2nd_Left_Command

Command to set the target temperature around rear left area

Values

TABLE 47

| value | Description | Remarks |
|---|---|---|
| 0 | No request | |
| 60 to 85 [unit: ° F.] (by 1.0° F.) | Temperature direction | |

Remarks

N/A

3.4.2.15. Hvac_TargetTemperature_2nd_Right_Command

Command to set the target temperature around rear right area

Values

TABLE 48

| value | Description | Remarks |
|---|---|---|
| 0 | No request | |
| 60 to 85 [unit: ° F.] (by 1.0° F.) | Temperature direction | |

Remarks

N/A 3.4.2.16. Hvac_Fan_Level_1st_Row_Command

Command to set the fan level on the front AC

Values

TABLE 49

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_1st_Command=OFF".

If you would like to turn the fan level to AUTO, you should transmit "Hvac_1st_Command=ON".

3.4.2.17. Hvac_Fan_Level_2nd_Row_Command

Command to set the fan level on the rear AC

Values

TABLE 50

| value | Description | Remarks |
|---|---|---|
| 0 | No request | |
| 1 to 7 (Maximum) | Fan level direction | |

Remarks

If you would like to turn the fan level to 0 (OFF), you should transmit "Hvac_2nd_Command=OFF".

If you would like to turn the fan level to AUTO, you should transmit "Hvac_2nd_Command=ON".

3.4.2.18. Hvac_1st_Row_AirOutlet_Mode_Command

Command to set the mode of 1st row air outlet

Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks

N/A 3.4.2.19. Hvac_2nd_Row_AirOutlet_Mode_CommandCommand to set the mode of 2nd row air outlet Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks

N/A 3.4.2.20. Hvac_Recirculate_Command

Command to Set the Air Recirculation Mode

Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks

N/A 3.4.2.21. Hvac_AC_Command

Command to set the AC mode

Values

TABLE 54

| value | Description | remarks |
|---|---|---|
| 00 | No request | |
| 01 | ON | means turning the AC mode ON |
| 02 | OFF | means turning the AC mode OFF |

Remarks

N/A 3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |
| Hvac_Temperature_$1^{st}$_Left_Status | Status of set temperature of $1^{st}$ row left | N/A |
| Hvac_Temperature_$1^{st}$_Right_Status | Status of set temperature of $1^{st}$ row right | N/A |
| Hvac_Temperature_$2^{nd}$_Left_Status | Status of set temperature of $2^{nd}$ row left | N/A |

TABLE 55-continued

| Signal Name | Description | Redundancy |
|---|---|---|
| Hvac_Temperature_2$^{nd}$_Right_Status | Status of set temperature of 2$^{nd}$ row right | N/A |
| Hvac_Fan_Level_1$^{st}$_Row_Status | Status of set fan level of 1$^{st}$ row | N/A |
| Hvac_Fan_Level_2$^{nd}$_Row_Status | Status of set fan level of 2$^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status

Status of the current turnsignallight mode of the vehicle platform

Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks

At the time of the disconnection detection of the turn lamp, state is ON.

At the time of the short detection of the turn lamp, State is OFF.

3.4.3.2. Headlight_Mode_Status

Status of the current headlight mode of the vehicle platform

Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks

N/A

Detailed Design

At the time of tail signal ON, Vehicle Platform sends 1.

At the time of Lo signal ON, Vehicle Platform sends 2.

At the time of Hi signal ON, Vehicle Platform sends 4.

At the time of any signal above OFF, Vehicle Platform sends 0.

3.4.3.3. Hazardlight_Mode_Status

Status of the current hazard lamp mode of the vehicle platform

Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks

N/A 3.4.3.4. Horn_Status

Status of the current horn of the vehicle platform

Values

TABLE 59

| Value | Description | Remarks |
|---|---|---|
| 0 | OFF | |
| 1 | ON | |
| 2 | reserved (unsupport) | |
| 3 | invalid (unsupport) | |

Remarks cannot detect any failure.

Vehicle platform sends "1" during Horn Pattern Command is active, if the horn is OFF.

3.4.3.5. Windshieldwiper_Mode_Front_Status

Status of the current front windshield wiper mode of the vehicle platform

Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |

TABLE 60-continued

| Value | Description | Remarks |
|---|---|---|
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks

Fail Mode Conditions detect signal discontinuity cannot detect except the above failure.

3.4.3.6. Windshieldwiper_Mode_Rear_Status

Status of the current rear windshield wiper mode of the vehicle platform

Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |
| 6 | fail | Rear wiper failed |
| 7 | invalid | |

Remarks cannot detect any failure.

3.4.3.7. Hvac_1st_Status

Status of activation of the 1st row HVAC

Values

TABLE 63

| value | Description | remarks |
|---|---|---|
| 0b | OFF | |
| 1b | ON | |

Remarks

N/A 3.4.3.8. Hvac_2nd_Status

Status of activation of the 2nd row HVAC

Values

TABLE 64

| value | Description | remarks |
|---|---|---|
| 0b | OFF | |
| 1b | ON | |

Remarks

N/A 3.4.3.9. Hvac_Temperature_1st_Left_Status

Status of set temperature of 1st row left

Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A 3.4.3.10. Hvac_Temperature_1st_Right_Status

Status of set temperature of 1st row right

Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A 3.4.3.11. Hvac_Temperature_2nd_Left_Status

Status of set temperature of 2nd row left

Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A 3.4.3.12. Hvac_Temperature_2nd_Right_Status

Status of set temperature of 2nd row right

Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks

N/A 3.4.3.13. Hvac_Fan_Level_1st_Row_Status

Status of set fan level of 1st row

Values

TABLE 69

| value | Description | remarks |
|---|---|---|
| 0 | OFF | |
| 1-7 | Fan Level | |
| 8 | Undefined | |

Remarks

N/A 3.4.3.14. Hvac_Fan_Level_2nd_Row_Status

Status of set fan level of 2nd row

Values

TABLE 70

| value | Description | remarks |
|---|---|---|
| 0 | OFF | |
| 1-7 | Fan Level | |
| 8 | Undefined | |

Remarks

N/A 3.4.3.15. Hvac_1st_Row_AirOutlet_Mode_Status

Status of mode of 1st row air outlet

Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks

N/A 3.4.3.16. Hvac_2nd_Row_AirOutlet_Mode_Status

Status of mode of 2nd row air outlet

Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks

N/A 3.4.3.17. Hvac_Recirculate_Status

Status of Set Air Recirculation Mode

Values

TABLE 73

| value | Description | remarks |
|---|---|---|
| 00 | OFF | means that the air recirculation mode is OFF |
| 01 | ON | means that the air recirculation mode is ON |

Remarks

N/A 3.4.3.18. Hvac_AC_Status

Status of set AC mode

Values

TABLE 74

| value | Description | remarks |
|---|---|---|
| 00 | OFF | means that the AC mode is OFF |
| 01 | ON | means that the AC mode is ON |

Remarks

N/A 3.4.3.19. 1st_Right_Seat_Occupancy_Status

Seat occupancy status in 1st left seat

Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks

When there is luggage on the seat, this signal may be set to "Occupied".

3.4.3.20. 1st_Left_Seat_Belt_Status

Status of driver's seat belt buckle switch

Values

TABLE 76

| value | Description | remarks |
|---|---|---|
| 0 | Buckled | |
| 1 | Unbuckled | |
| 2 | Undetermined | |
| 3 | Fault of a switch | |

Remarks

When Driver's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.21. 1st_Right_Seat_Belt_Status

Status of passenger's seat belt buckle switch

Values

TABLE 77

| value | Description | remarks |
|---|---|---|
| 0 | Buckled | |
| 1 | Unbuckled | |
| 2 | Undetermined | |
| 3 | Fault of a switch | |

Remarks

When Passenger's seat belt buckle switch status signal is not set, [undetermined] is transmitted.

It is checking to a person in charge, when using it. (Outputs "undetermined=10" as an initial value.)

The judgement result of buckling/unbuckling shall be transferred to CAN transmission buffer within 1.3 s after IG_ON or before allowing firing, whichever is earlier.

3.4.3.22. 2nd_Left_Seat_Belt_Status

Seat belt buckle switch status in 2nd left seat

Values

TABLE 78

| value | Description | remarks |
|---|---|---|
| 0 | Buckled | |
| 1 | Unbuckled | |
| 2 | Undetermined | |
| 3 | Reserved | |

Remarks cannot detect sensor failure.

3.4.3.23. 2nd_Right_Seat_Belt_Status

Seat belt buckle switch status in 2nd right seat

Values

TABLE 79

| value | Description | remarks |
|---|---|---|
| 0 | Buckled | |
| 1 | Unbuckled | |
| 2 | Undetermined | |
| 3 | Reserved | |

Remarks cannot detect any failure.

3.5. APIs for Power control

3.5.1. Functions

T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to control the power mode of the vehicle platform

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep] [Wake] [Driving Mode], which are controllable via API.

[Sleep]

Vehicle power off condition. In this mode, the high voltage battery does not supply power, and neither VCIB nor other VP ECUs are activated.

[Wake]

VCIB is awake by the low voltage battery. In this mode, ECUs other than VCIB are not awake except for some of the body electrical ECUs.

[Driving Mode]

Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status
Status of the current power mode of the vehicle platform
Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |
| 07 | unknown | means unhealthy situation would occur |

Remarks

VCIB will transmit [Sleep] as Power_Mode_Status continuously for 3000 [ms] after executing the sleep sequence. And then, VCIB will be shutdown.

3.6. APIs for Safety
3.6.1. Functions
T.B.D.
3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation

Request for operation according to status of vehicle platform toward ADS

Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks

T.B.D.

3.6.3.2. Passive_Safety_Functions_Triggered

Crash detection Signal

Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall send a voltage OFF request for 5 s or less after crash in HV vehicle.

Transmission interval is 100 ms within fuel cutoff motion delay allowance time (1 s) so that data can be transmitted more than 5 times. In this case, an instantaneous power interruption is taken into account.

3.6.3.3. Brake_System_Degradation_Modes

Indicate Brake_System status

Values

TABLE 88

| value | Description | remarks |
|---|---|---|
| 0 | Normal | — |
| 1 | Failure detected | — |

Remarks

When the Failure is detected, Safe stop is moved.

3.6.3.4. Propulsive_System_Degradation_Modes

Indicate Powertrain_System status

Values

TABLE 89

| value | Description | remarks |
|---|---|---|
| 0 | Normal | — |
| 1 | Failure detected | — |

Remarks

When the Failure is detected, Safe stop is moved.

3.6.3.5. Direction_Control_Degradation_Modes

Indicate Direction_Control status

Values

TABLE 90

| value | Description | remarks |
|---|---|---|
| 0 | Normal | — |
| 1 | Failure detected | — |

Remarks

When the Failure is detected, Safe stop is moved.

When the Failure is detected, Propulsion Direction Command is refused.

3.6.3.6. WheelLock_Control_Degradation_Modes

Indicate WheelLock_Control status

Values

TABLE 91

| value | Description | remarks |
|---|---|---|
| 0 | Normal | — |
| 1 | Failure detected | — |

Remarks

Primary indicates EPB status, and Secondary indicates SBW indicates.

When the Failure is detected, Safe stop is moved.

3.6.3.7. Steering_System_Degradation_Modes

Indicate Steering_System status

Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks
When the Failure are detected, Safe stop is moved.
3.6.3.8. Power_System_Degradation_Modes
[T.B.D]
3.6.3.9. Communication_Degradation_Modes
[T.B.D]
3.7. APIs for Security
3.7.1. Functions
T.B.D.
3.7.2. Inputs

TABLE 93

| Signal Name | Description | Redundancy |
|---|---|---|
| 1st_Left_Door_Lock_Command | Command to control each door lock of the vehicle platform | N/A |
| 1st_Right_Door_Lock_Command | | N/A |
| 2nd_Left_Door_Lock_Command | Lock command supports only ALL Door Lock. Unlock command supports 1st-left Door unlock only, and ALL Door unlock. Trunk Door Lock/unlock command include in ALL Door lock/unlock | N/A |
| 2nd_Right_Door_Lock_Command | | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command
Command to control each door lock of the vehicle platform
Values

TABLE 94

| Value | Description | Remarks |
|---|---|---|
| 0 | No Request | |
| 1 | Lock (unsupported) | |
| 2 | Unlock | |
| 3 | reserved | |

Remarks
Lock command supports only ALL Door Lock.
Unlock command supports 1st-left Door unlock only, and ALL Door unlock.

3.7.2.2. Central_Vehicle_Lock_Exterior_Command
Command to control the all door lock of the vehicle platform.
Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks
Lock command supports only ALL Door Lock.
Unlock command supports 1st-left Door unlock only, and ALL Door unlock.
3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the current 1st-left door lock mode of the vehicle platform

Values

TABLE 97

| value | Description | Remarks |
|---|---|---|
| 0 | reserved | |
| 1 | Locked | D seat locked |
| 2 | Unlocked | D seat unlocked |
| 3 | invalid | |

Remarks cannot detect any failure.

3.7.3.2. 1st_Right_Door_Lock_Status

Status of the current 1st-right door lock mode of the vehicle platform

Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the current 2nd-left door lock mode of the vehicle platform

Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks cannot detect any failure.

3.7.3.4. 2nd_Right_Door_Lock_Status

Status of the current 2nd-right door lock mode of the vehicle platform

Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the current all door lock mode of the vehicle platform

Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status, in case any door unlocked, sends 0.

in case all door locked, sends 1.

3.7.3.6. Vehicle_Alarm_Status

Status of the current vehicle alarm of the vehicle platform

Values

TABLE 102

| Value | Description | remarks |
|---|---|---|
| 0 | Disarmed | Auto alarm system not active |
| 1 | Armed | Auto alarm system active • not on alert |
| 2 | Active | Auto alarm system active • on alert |
| 3 | invalid | |

Remarks

N/A 3.8. APIs for MaaS Service 3.8.1. Functions

T.B.D.

3.8.2. Inputs

TABLE 103

| Signal Name | Description | Redundancy |
|---|---|---|
| T.B.D. | | |

3.8.3. Outputs

TABLE 104

| Signal Name | Description | Redundancy |
|---|---|---|
| T.B.D. | | |

Example 2

Toyota's MaaS Vehicle Platform Architecture Specification

[Standard Edition #0.1]

History of Revision

TABLE 105

| Date of Revision | ver. | Summary of Revision | Reviser |
|---|---|---|---|
| Nov. 4, 2019 | 0.1 | Creating a new material | MaaS Business Div. |

Index
1. General Concept 4
1.1. Purpose of this Specification 4
1.2. Target Vehicle Type 4
1.3. Target Electronic Platform 4
1.4. Definition of Term 4
1.5. Precaution for Handling 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
   3.3.1. The countermeasure for a remote attack 11
   3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 14
5. Function Allocation 15
5.1. in a healthy situation 15
5.2. in a single failure 16
6. Data Collection 18
6.1. At event 18
6.2. Constantly 18
1. General Concept
1.1. Purpose of this Specification This document is an architecture specification of Toyota's MaaS Vehicle Platform and contains the outline of system in vehicle level.

1.2. Target Vehicle Type

This specification is applied to the Toyota vehicles with the electronic platform called 19ePF [ver.1 and ver.2].

The representative vehicle with 19ePF is shown as follows.

e-Palette, Sienna, RAV4, and so on.

1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

1.4. Precaution for Handling

This is an early draft of the document.

All the contents are subject to change. Such changes are notified to the users. Please note that some parts are still T.B.D. will be updated in the future.

2. Architectural Concept
2.1. Overall Structure of MaaS

Figure 21:
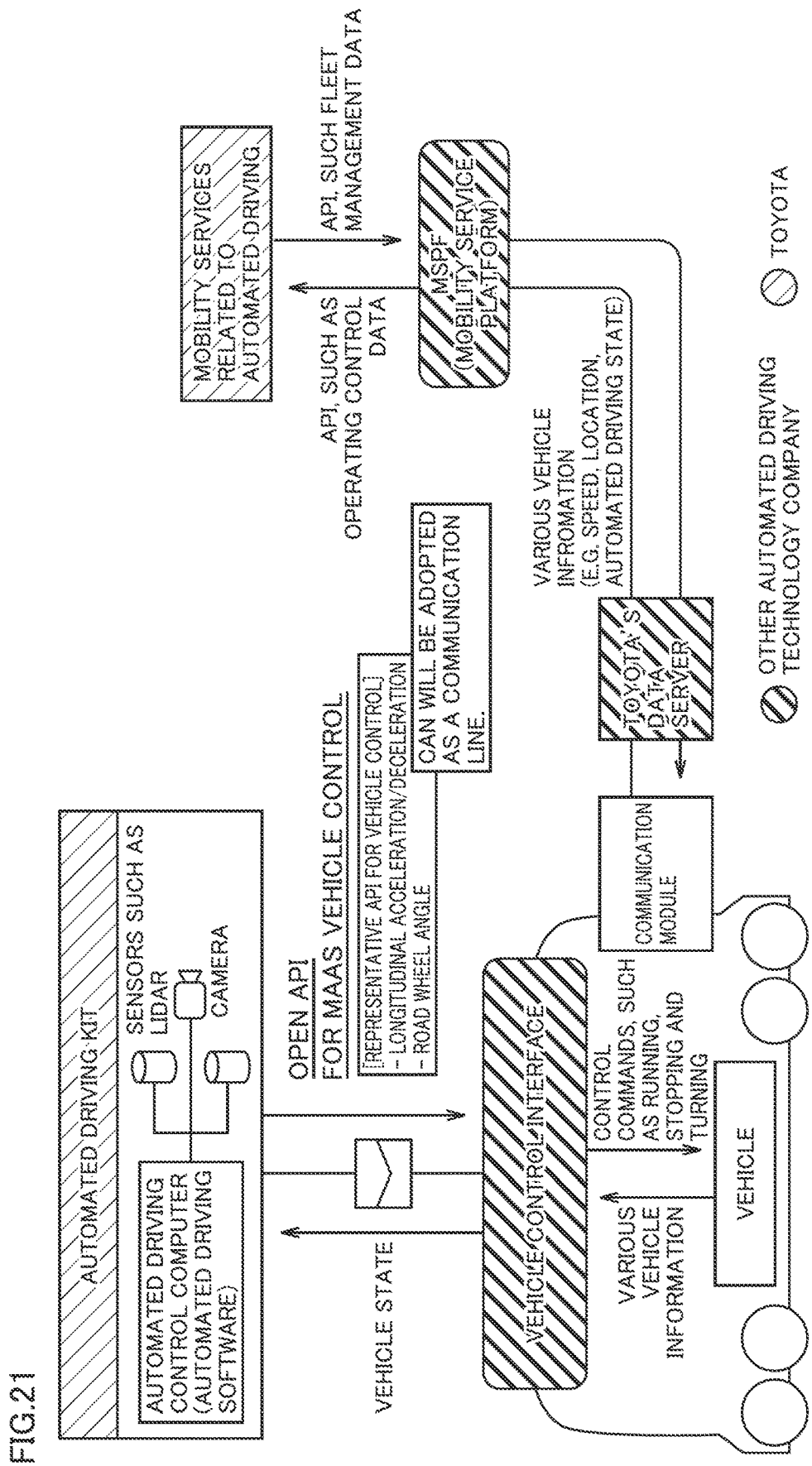
FIG. 21 is a diagram of an overall configuration of MaaS.

The overall structure of MaaS with the target vehicle is shown (FIG. 21).

Vehicle control technology is being used as an interface for technology providers.

Technology providers can receive open API such as vehicle state and vehicle control, necessary for development of automated driving systems.

2.2. Outline of System Architecture on the Vehicle

Figure 22:
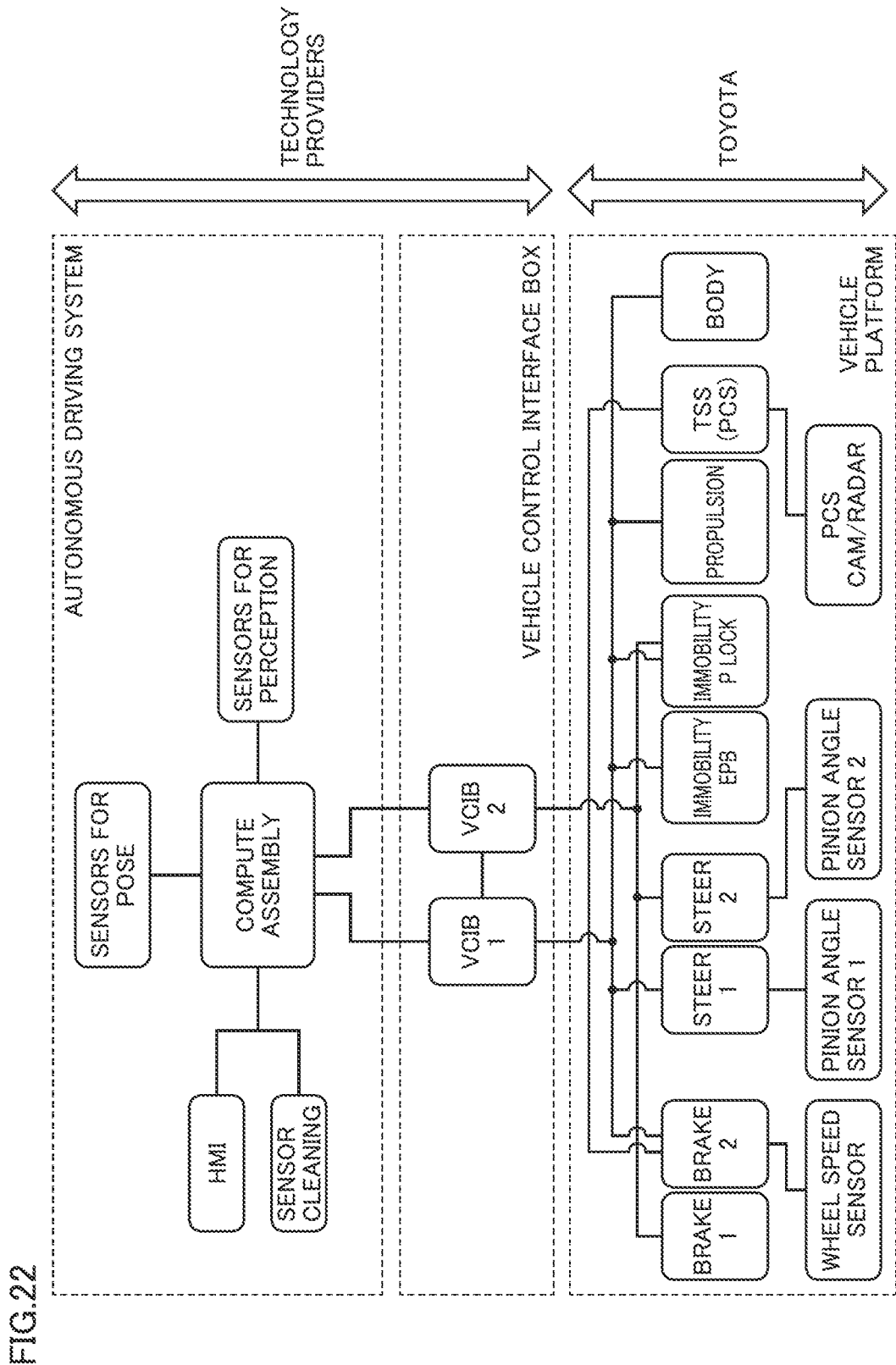
FIG. 22 is a diagram of a system configuration of a vehicle.

The system architecture on the vehicle as a premise is shown (FIG. 22).

The target vehicle of this document will adopt the physical architecture of using CAN for the bus between ADS and VCIB. In order to realize each API in this document, the CAN frames and the bit assignments are shown in the form of "bit assignment chart" as a separate document.

2.3. Outline of Power Supply Architecture on the Vehicle

Figure 23:
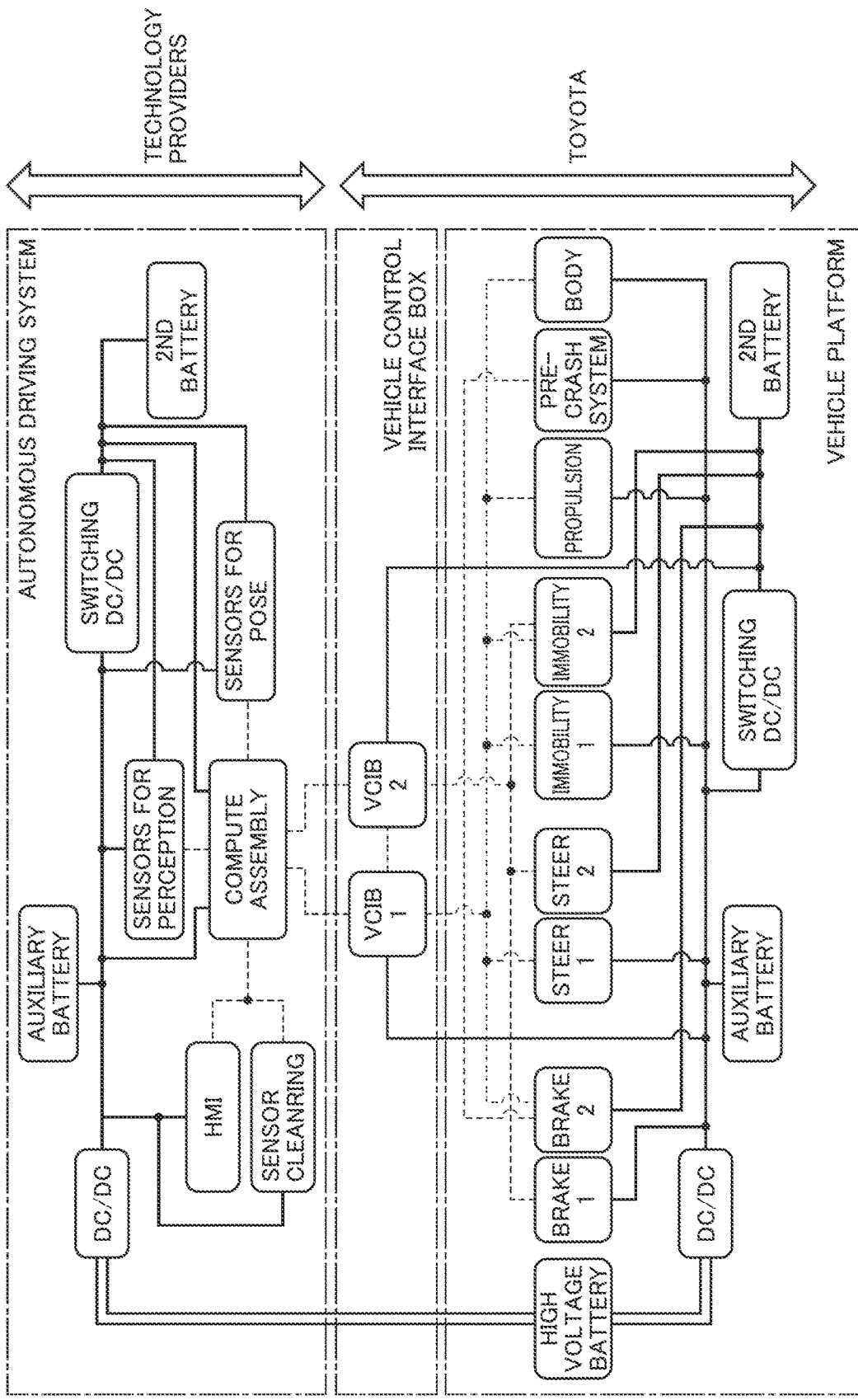
FIG. 23 is a diagram showing a configuration of supply of power of the vehicle.

The power supply architecture as a premise is shown as follows (FIG. 23).

The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept
3.1. Overall Safety Concept

The basic safety concept is shown as follows.

Figure 24:
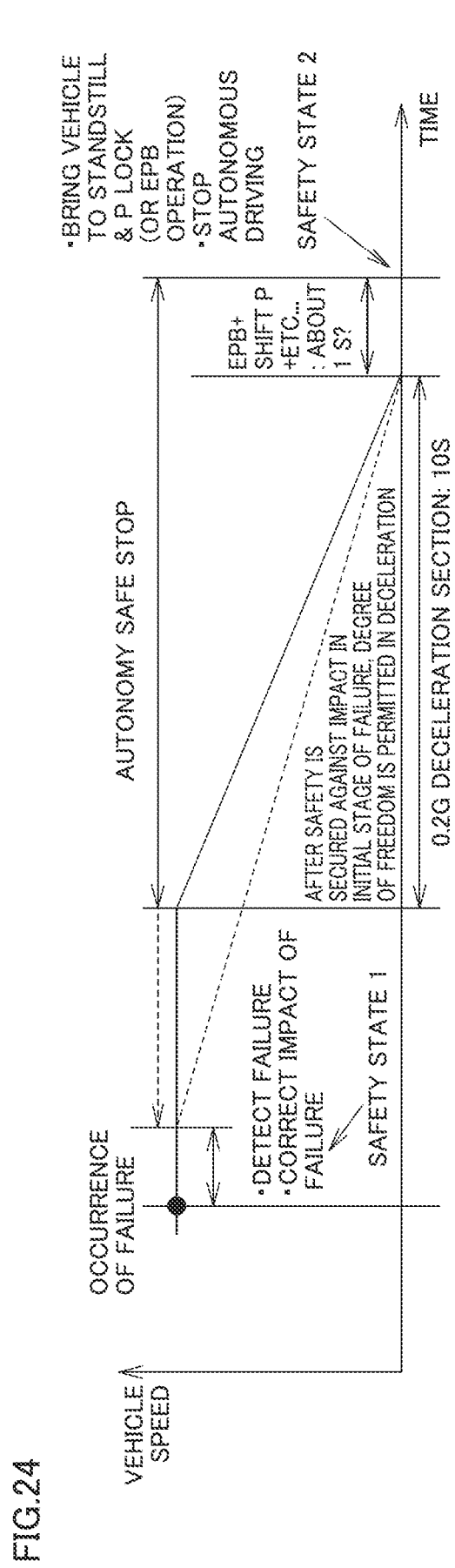
FIG. 24 is a diagram illustrating strategies until the vehicle is safely brought to a standstill at the time of occurrence of a failure.

The strategy of bringing the vehicle to a safe stop when a failure occurs is shown as follows (FIG. 24).

1. After occurrence of a failure, the entire vehicle executes "detecting a failure" and "correcting an impact of failure" and then achieves the safety state 1.

2. Obeying the instructions from the ADS, the entire vehicle stops in a safe space at a safe speed (assumed less than 0.2G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
|---|---|
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the Capability from becoming 0.3 G or less.

Redundant Steering

Any single failure on the Steering System doesn't cause loss of steering functionality. However, depending on where the failure occurred, the capability left might not be equivalent to the primary system's capability. In this case, the steering system is designed to prevent the capability from becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept 4.1. Outline

Regarding security, Toyota's MaaS vehicle adopts the security document issued by Toyota as an upper document.

4.2. Assumed Risks

The entire risk includes not only the risks assumed on the base e-PF but also the risks assumed for the Autono-MaaS vehicle.

The entire risk is shown as follows.

[Remote Attack]
To vehicle
  Spoofing the center
  ECU Software Alternation
  DoS Attack
  Sniffering
From vehicle
  Spoofing the other vehicle
  Software Alternation for a center or an ECU on the other vehicle
  DoS Attack to a center or other vehicle
  Uploading illegal data
[Modification]
Illegal Reprogramming
Setting up an illegal ADK
Installation of an unauthenticated product by a customer 4.3. Countermeasure for the Risks The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The Countermeasure for a Modification is Shown as Follows.

For measures against a counterfeit autonomous driving kit, device authentication and message authentication are carried out. In storing a key, measures against tampering should be provided and a key set is changed for each pair of a vehicle and an autonomous driving kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation 5.1. In a Healthy Situation

Figure 25:
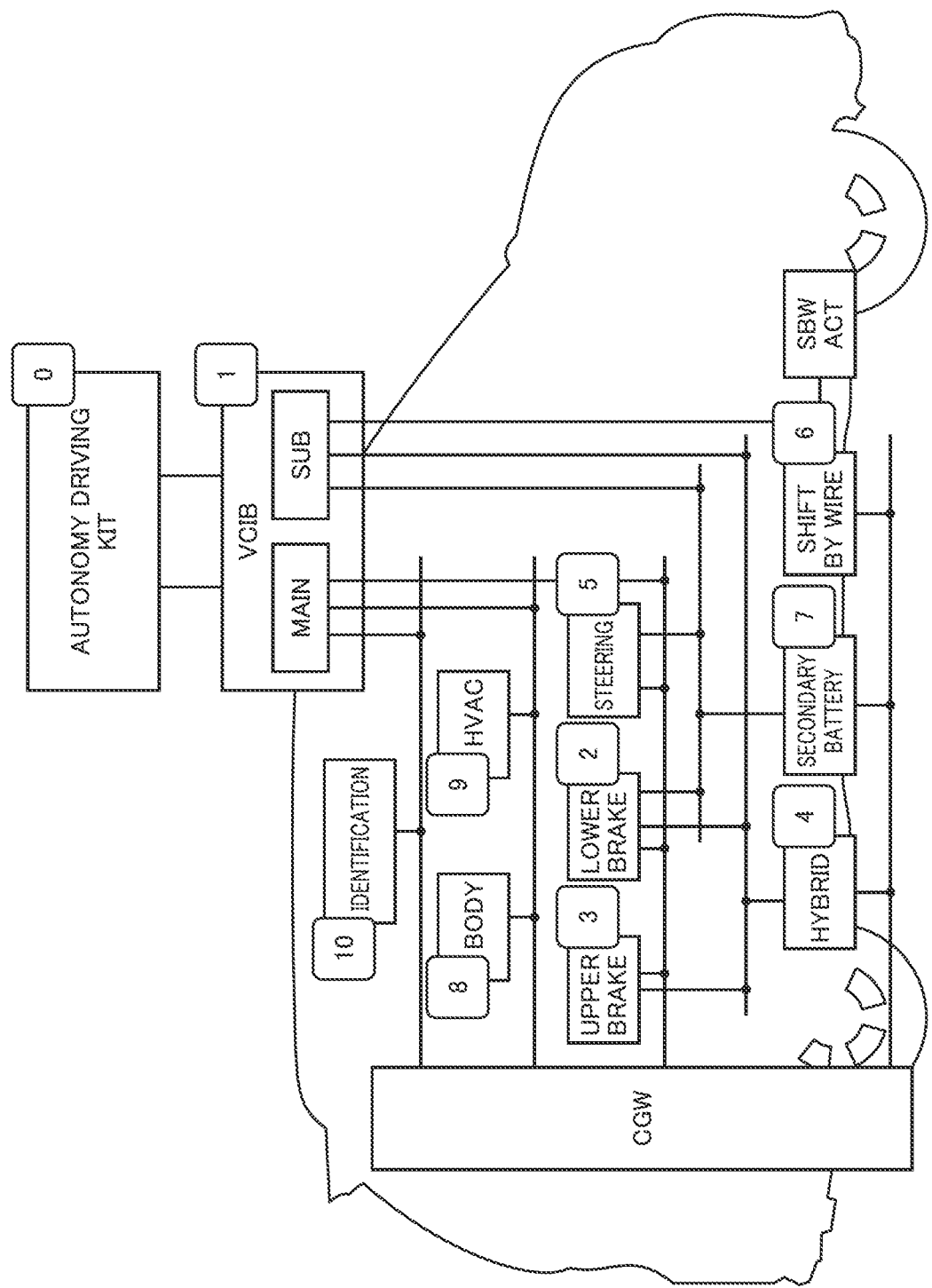
FIG. 25 is a diagram showing arrangement of representative functions of the vehicle.

The allocation of representative functionalities is shown as below (FIG. 25).

[Function Allocation]

TABLE 108

| Function category | Function name | Related to # | remarks |
| --- | --- | --- | --- |
| Planning | Plan for driving path | 0 | |
| | Calculating control indications | 0 | e.g. longitudinal G |
| Overall | API Pub/Sub | 1 | One system with redundancy |
| Security | Autonomy Driving Kit Authentication | 1 | One system with redundancy |

TABLE 108-continued

| Function category | Function name | Related to # | remarks |
|---|---|---|---|
| | Message Authentication | 1 | One system with redundancy |
| | Door locking control | 8 | |
| Longitudinal/Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle on which an autonomous driving system is mountable, the vehicle comprising:
a vehicle platform that controls the vehicle in accordance with an instruction from the autonomous driving system; and
a vehicle control interface box that interfaces between the vehicle platform and the autonomous driving system,
the vehicle platform including a headlight system, a hazard light system, a front wiper system, and a rear wiper system, wherein
in an autonomous driving mode, driver operation of a shift lever is not reflected in propulsion direction status indicating a current shift range,
the vehicle platform sets an operation mode of each of the headlight system, the hazard light system, the front wiper system, and the rear wiper system in accordance with an operation mode request for each of the headlight system, the hazard light system, the front wiper system, and the rear wiper system received from the autonomous driving system and/or an operation by a user onto an operation apparatus provided for each of the headlight system, the hazard light system, the front wiper system, and the rear wiper system, and
the vehicle platform sets the operation mode with the operation by the user being prioritized over the operation mode request.

2. The vehicle according to claim 1, wherein
when the operation mode of the headlight system has been set to a first prescribed mode by the operation by the user, the vehicle platform sets the operation mode of the headlight system in accordance with the operation mode request.

3. The vehicle according to claim 2, wherein
when the operation mode of the headlight system has been set to a mode other than the first prescribed mode by the operation by the user, the vehicle platform does not set the operation mode of the headlight system in accordance with the operation mode request.

4. The vehicle according to claim 2, wherein
the first prescribed mode includes an OFF mode and an AUTO mode,
the OFF mode is a mode in which a headlight is turned off, and
the AUTO mode is a mode in which the operation mode of the headlight system is automatically set by the vehicle platform.

5. The vehicle according to claim 1, wherein
when the operation mode of the front wiper system has been set to a second prescribed mode by the operation by the user, the vehicle platform sets the operation mode of the front wiper system in accordance with the operation mode request.

6. The vehicle according to claim 5, wherein
when the operation mode of the front wiper system has been set to a mode other than the second prescribed mode by the operation by the user, the vehicle platform does not set the operation mode of the front wiper system in accordance with the operation mode request.

7. The vehicle according to claim 5, wherein
the second prescribed mode includes an OFF mode and an Auto mode,
the OFF mode is a mode in which a front wiper in the front wiper system is stopped, and
the Auto mode is a mode in which the operation mode of the front wiper system is automatically set by the vehicle platform.

8. The vehicle according to claim 5, wherein
the front wiper system includes as the operation mode, an intermittent operation mode in which a front wiper is intermittently operated, and
when the operation mode of the front wiper system has been set to the intermittent operation mode, the vehicle platform
sets an operation interval in accordance with an operation interval request that indicates the operation interval of the front wiper in the intermittent operation mode received from the autonomous driving system and/or the operation by the user onto the operation apparatus, and
sets the operation interval with the operation by the user being prioritized over the operation interval request.

9. A vehicle comprising:
an autonomous driving system that creates a driving plan;
a vehicle platform that carries out vehicle control in accordance with an instruction from the autonomous driving system; and
a vehicle control interface that interfaces between the vehicle platform and the autonomous driving system,
the vehicle platform including a headlight system, a hazard light system, a front wiper system, and a rear wiper system, wherein
in an autonomous driving mode, driver operation of a shift lever is not reflected in propulsion direction status indicating a current shift range,
the vehicle platform sets an operation mode of each of the headlight system, the hazard light system, the front wiper system, and the rear wiper system in accordance with an operation mode request for each of the headlight system, the hazard light system, the front wiper system, and the rear wiper system received from the autonomous driving system and/or an operation by a user onto an operation apparatus provided for each of the headlight system, the hazard light system, the front wiper system, and the rear wiper system, and
the vehicle platform sets the operation mode with the operation by the user being prioritized over the operation mode request.

10. The vehicle according to claim 9, wherein
when the operation mode of the headlight system has been set to a first prescribed mode by the operation by the user, the vehicle platform sets the operation mode of the headlight system in accordance with the operation mode request.

11. The vehicle according to claim 10, wherein
when the operation mode of the headlight system has been set to a mode other than the first prescribed mode by the operation by the user, the vehicle platform does not set the operation mode of the headlight system in accordance with the operation mode request.

12. The vehicle according to claim 10, wherein
the first prescribed mode includes an OFF mode and an AUTO mode,
the OFF mode is a mode in which a headlight is turned off, and
the AUTO mode is a mode in which the operation mode of the headlight system is automatically set by the vehicle platform.

13. The vehicle according to claim 9, wherein
when the operation mode of the front wiper system has been set to a second prescribed mode by the operation by the user, the vehicle platform sets the operation mode of the front wiper system in accordance with the operation mode request.

14. The vehicle according to claim 13, wherein
when the operation mode of the front wiper system has been set to a mode other than the second prescribed mode by the operation by the user, the vehicle platform does not set the operation mode of the front wiper system in accordance with the operation mode request.

15. The vehicle according to claim 13, wherein
the second prescribed mode includes an OFF mode and an Auto mode,
the OFF mode is a mode in which a front wiper in the front wiper system is stopped, and
the Auto mode is a mode in which the operation mode of the front wiper system is automatically set by the vehicle platform.

16. The vehicle according to claim 13, wherein
the front wiper system includes as the operation mode, an intermittent operation mode in which a front wiper is intermittently operated,
when the operation mode of the front wiper system has been set to the intermittent operation mode, the vehicle platform
sets an operation interval in accordance with an operation interval request that indicates the operation interval of the front wiper in the intermittent operation mode received from the autonomous driving system and/or the operation by the user onto the operation apparatus, and
sets the operation interval with the operation by the user being prioritized over the operation interval request.

17. A method of controlling a vehicle on which an autonomous driving system is mountable, the vehicle including a vehicle platform that controls the vehicle in accordance with an instruction from the autonomous driving system and a vehicle control interface that interfaces between the vehicle platform and the autonomous driving system, the vehicle platform including a headlight system, a hazard light system, a front wiper system, and a rear wiper system, the method comprising:
in an autonomous driving mode, not reflecting driver operation of a shift lever in propulsion direction status indicating a current shift range,
setting an operation mode of each of the headlight system, the hazard light system, the front wiper system, and the rear wiper system in accordance with an operation mode request for each of the headlight system, the hazard light system, the front wiper system, and the rear wiper system received from the autonomous driving system and/or an operation by a user onto an operation apparatus provided for each of the headlight system, the hazard light system, the front wiper system, and the rear wiper system; and
setting the operation mode with the operation by the user being prioritized over the operation mode request.

* * * * *